United States Patent
Wiley et al.

(10) Patent No.: US 9,998,300 B2
(45) Date of Patent: *Jun. 12, 2018

(54) N-PHASE PHASE AND POLARITY ENCODED SERIAL INTERFACE

(71) Applicant: QUALCOMM Incorporated, San Diego, CA (US)

(72) Inventors: George Alan Wiley, San Diego, CA (US); Glenn Raskin, Carlsbad, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/598,000

(22) Filed: May 17, 2017

(65) Prior Publication Data
US 2018/0006846 A1    Jan. 4, 2018

Related U.S. Application Data

(60) Continuation of application No. 14/966,236, filed on Dec. 11, 2015, now Pat. No. 9,680,666, which is a
(Continued)

(51) Int. Cl.
*H04K 1/10*    (2006.01)
*H04L 27/28*    (2006.01)
(Continued)

(52) U.S. Cl.
CPC .......... *H04L 25/0272* (2013.01); *H04L 5/20* (2013.01); *H04L 25/4917* (2013.01);
(Continued)

(58) Field of Classification Search
CPC . H04L 25/4908; H04L 25/4904; H04L 25/14; H04L 25/4925; H03M 5/12
(Continued)

(56) References Cited

U.S. PATENT DOCUMENTS 3,866,147 A * 2/1975 De Couvreur ...... H04L 25/4923
                                                        326/60
4,083,005 A * 4/1978 Looschen ............... H04L 25/49
                                                       375/257
(Continued)

FOREIGN PATENT DOCUMENTS

CN          1406008 A       3/2003
CN          1871635 A      11/2006
(Continued)

OTHER PUBLICATIONS

International Preliminary Report on Patentability—PCT/US2013/030937, The International Bureau of WIPO—Geneva, Switzerland, dated Sep. 25, 2014 (121284WO).
(Continued)

*Primary Examiner* — James M Perez
(74) *Attorney, Agent, or Firm* — Loza & Loza LLP

(57) ABSTRACT

System, methods and apparatus are described that facilitate transmission of data, particularly between two devices within an electronic apparatus. Information is transmitted in N-phase polarity encoded symbols. Data is encoded in multi-bit symbols, and the multi-bit symbols are transmitted on a plurality of connectors. The multi-bit symbols may be transmitted by mapping the symbols to a sequence of states of the plurality of connectors, and driving the connectors in accordance with the sequence of states. The timing of the sequence of states is determinable at a receiver at each transition between sequential states. The state of each connector may be defined by polarity and direction of rotation of a multi-phase signal transmitted on the each connector.

30 Claims, 17 Drawing Sheets

Related U.S. Application Data division of application No. 14/090,625, filed on Nov. 26, 2013, now Pat. No. 9,231,790, which is a continuation-in-part of application No. 13/826,546, filed on Mar. 14, 2013, now Pat. No. 9,083,598, which is a continuation-in-part of application No. 13/301,454, filed on Nov. 21, 2011, now Pat. No. 8,472,551, which is a continuation of application No. 11/712,941, filed on Mar. 2, 2007, now Pat. No. 8,064,535.

(51) Int. Cl.
  *H04L 25/02* (2006.01)
  *H04L 25/49* (2006.01)
  *H04L 5/20* (2006.01)

(52) U.S. Cl.
  CPC ...... *H04L 25/0282* (2013.01); *H04L 25/0294* (2013.01); *H04L 25/0298* (2013.01)

(58) Field of Classification Search
  USPC ............... 375/259–264, 284–288, 290–293; 341/50, 58, 68–70
  See application file for complete search history.

(56) References Cited

U.S. PATENT DOCUMENTS

| | | | |
|---|---|---|---|
| 4,201,958 A * | 5/1980 | Ahamed | H03M 3/02 341/143 |
| 4,280,221 A * | 7/1981 | Chun | G08C 19/16 375/257 |
| 4,355,310 A * | 10/1982 | Belaigues | G01V 11/002 340/10.1 |
| RE31,311 E | 7/1983 | Miller | |
| 4,468,787 A * | 8/1984 | Keiper, Jr. | H04L 25/4925 341/57 |
| 4,475,212 A * | 10/1984 | McLean | H03M 5/18 375/286 |
| 4,631,428 A * | 12/1986 | Grimes | H03M 5/16 326/59 |
| 4,682,215 A | 7/1987 | Adachi | |
| 4,910,750 A * | 3/1990 | Fisher | H04L 25/4908 341/57 |
| 4,980,898 A | 12/1990 | Silvian | |
| 5,160,929 A * | 11/1992 | Costello | H03M 5/18 341/57 |
| 5,166,956 A * | 11/1992 | Baltus | H04L 25/4917 341/56 |
| 5,259,002 A * | 11/1993 | Carlstedt | H03M 5/06 375/258 |
| 5,323,307 A * | 6/1994 | Wolf | H02J 3/14 700/22 |
| 5,327,440 A * | 7/1994 | Fredrickson | H03M 13/3961 714/795 |
| 5,359,595 A | 10/1994 | Weddle et al. | |
| 5,381,414 A | 1/1995 | Gibson | |
| 5,461,379 A * | 10/1995 | Weinman, Jr. | H03M 5/18 341/57 |
| 5,563,526 A | 10/1996 | Hastings et al. | |
| 5,664,948 A | 9/1997 | Dimitriadis et al. | |
| 5,682,157 A | 10/1997 | Asmussen et al. | |
| 5,687,326 A * | 11/1997 | Robinson | G06F 13/4286 375/220 |
| 5,733,131 A | 3/1998 | Park | |
| 5,809,519 A | 9/1998 | Lee | |
| 5,852,630 A | 12/1998 | Langberg et al. | |
| 5,939,939 A | 8/1999 | Gaynor et al. | |
| 6,005,895 A * | 12/1999 | Perino | H04L 5/20 341/56 |
| 6,081,513 A | 6/2000 | Roy | |
| 6,091,709 A | 7/2000 | Harrison et al. | |
| 6,175,319 B1 * | 1/2001 | Schneider | G11B 20/10009 341/68 |
| 6,243,761 B1 | 6/2001 | Mogul et al. | |
| 6,256,509 B1 | 7/2001 | Tanaka et al. | |
| 6,278,429 B1 | 8/2001 | Ruth et al. | |
| 6,288,739 B1 | 9/2001 | Hales et al. | |
| 6,317,465 B1 * | 11/2001 | Akamatsu | H04L 25/0272 375/257 |
| 6,346,832 B1 | 2/2002 | Young | |
| 6,359,931 B1 | 3/2002 | Perino et al. | |
| 6,430,196 B1 | 8/2002 | Baroudi | |
| 6,452,420 B1 * | 9/2002 | Wong | H04L 5/20 326/30 |
| 6,504,875 B2 * | 1/2003 | Perino | H04L 5/20 375/257 |
| 6,556,628 B1 * | 4/2003 | Poulton | H04L 25/0266 375/257 |
| 6,587,037 B1 | 7/2003 | Besser et al. | |
| 6,611,503 B1 | 8/2003 | Fitzgerald et al. | |
| 6,621,438 B1 * | 9/2003 | Hong | H03M 1/0665 341/144 |
| 6,649,377 B1 | 11/2003 | Allard et al. | |
| 6,654,565 B2 | 11/2003 | Kenny | |
| 6,662,019 B2 | 12/2003 | Kamel et al. | |
| 6,694,377 B1 * | 2/2004 | Beyer | G06F 13/4286 709/250 |
| 6,703,868 B2 | 3/2004 | Savaria et al. | |
| 6,703,949 B2 * | 3/2004 | Greenstreet | H03M 5/145 341/50 |
| 6,728,320 B1 * | 4/2004 | Khasnis | H04L 25/0266 375/257 |
| 6,778,493 B1 | 8/2004 | Ishii | |
| 6,797,891 B1 | 9/2004 | Blair et al. | |
| 6,813,638 B1 | 11/2004 | Sevanto et al. | |
| 6,836,290 B1 | 12/2004 | Chung et al. | |
| 6,842,389 B2 * | 1/2005 | Perner | G11C 11/16 365/209 |
| 6,865,610 B2 | 3/2005 | Bolosky et al. | |
| 6,867,668 B1 | 3/2005 | Dagostino et al. | |
| 6,891,899 B2 * | 5/2005 | Hall | H04L 25/4923 375/295 |
| 6,914,637 B1 | 7/2005 | Wolf et al. | |
| 7,027,522 B2 * | 4/2006 | Pickering | H04L 5/20 375/286 |
| 7,047,155 B2 * | 5/2006 | Barrenscheen | G06F 11/221 702/176 |
| 7,072,406 B1 * | 7/2006 | Harma | G06F 13/4291 348/495 |
| 7,106,276 B2 * | 9/2006 | Akiyama | G09G 3/3413 313/498 |
| 7,113,550 B2 | 9/2006 | Stonecypher et al. | |
| 7,142,612 B2 * | 11/2006 | Horowitz | H04L 25/4919 375/286 |
| 7,143,177 B1 | 11/2006 | Johnson et al. | |
| 7,145,411 B1 | 12/2006 | Blair et al. | |
| 7,154,418 B2 * | 12/2006 | Lee | H03M 5/04 341/60 |
| 7,167,527 B1 * | 1/2007 | Park | H04L 25/4917 375/286 |
| 7,224,737 B2 * | 5/2007 | Voutilainen | H04L 7/06 332/115 |
| 7,230,989 B2 | 6/2007 | Biman et al. | |
| 7,233,773 B2 | 6/2007 | Hansen et al. | |
| 7,263,133 B1 | 8/2007 | Miao | |
| 7,269,430 B2 | 9/2007 | Moorti et al. | |
| 7,336,139 B2 | 2/2008 | Blair et al. | |
| 7,339,502 B2 * | 3/2008 | Furtner | G06F 13/4295 341/55 |
| 7,355,532 B2 * | 4/2008 | Kim | H04B 14/04 341/55 |
| 7,471,285 B2 * | 12/2008 | Cheng | H04L 25/0272 345/204 |
| 7,508,881 B2 * | 3/2009 | Choi | H04L 5/20 327/359 |
| 7,529,957 B2 | 5/2009 | Krantz et al. | |
| 7,539,882 B2 | 5/2009 | Jessup et al. | |
| 7,561,624 B2 | 7/2009 | Fonseka et al. | |
| 7,626,442 B2 * | 12/2009 | Zerbe | H04L 25/03057 327/336 |

(56) References Cited

U.S. PATENT DOCUMENTS

| | | | |
|---|---|---|---|
| 7,656,321 B2* | 2/2010 | Wang | H04L 25/0272 327/71 |
| 7,688,929 B2 | 3/2010 | Co | |
| 7,692,563 B2* | 4/2010 | Hamada | H04L 25/085 333/12 |
| 7,697,628 B2* | 4/2010 | Choi | H04L 25/085 341/55 |
| 7,826,551 B2 | 11/2010 | Lee et al. | |
| 7,859,356 B2 | 12/2010 | Pandey | |
| 8,024,477 B2 | 9/2011 | Rothman et al. | |
| 8,027,405 B2* | 9/2011 | Den Ouden | H04L 5/20 326/86 |
| 8,064,535 B2* | 11/2011 | Wiley | H04L 5/20 375/288 |
| 8,320,494 B2* | 11/2012 | Zerbe | G11C 7/1051 326/60 |
| 8,472,551 B2* | 6/2013 | Wiley | H04L 5/20 375/288 |
| 8,848,810 B2 | 9/2014 | Lee et al. | |
| 8,996,740 B2 | 3/2015 | Wiley et al. | |
| 9,083,598 B2* | 7/2015 | Wiley | H04L 5/20 |
| 9,112,815 B2 | 8/2015 | Wiley | |
| 9,143,362 B2 | 9/2015 | Wiley et al. | |
| 9,231,790 B2 | 1/2016 | Wiley et al. | |
| 9,313,058 B2 | 4/2016 | Sengoku et al. | |
| 9,337,997 B2 | 5/2016 | Sengoku et al. | |
| 9,369,237 B2* | 6/2016 | Wiley | H04L 1/0014 |
| 9,444,612 B2 | 9/2016 | Sengoku et al. | |
| 9,455,850 B2* | 9/2016 | Wiley | H04L 5/20 |
| 9,496,879 B1* | 11/2016 | Duan | H04L 7/033 |
| 9,520,988 B1* | 12/2016 | Wiley | H04L 7/0083 |
| 9,553,635 B1 | 1/2017 | Sejpal et al. | |
| 9,621,333 B2* | 4/2017 | Wiley | H04L 7/0087 |
| 9,680,666 B2* | 6/2017 | Wiley | H04L 25/0272 |
| 9,711,041 B2* | 7/2017 | Wiley | G08C 19/16 |
| 2002/0061072 A1 | 5/2002 | Pickering et al. | |
| 2002/0064247 A1 | 5/2002 | Ahn et al. | |
| 2002/0112070 A1 | 8/2002 | Ellerbrock et al. | |
| 2002/0181618 A1 | 12/2002 | Muranaka | |
| 2003/0016758 A1 | 1/2003 | Wu et al. | |
| 2003/0095606 A1* | 5/2003 | Horowitz | H04L 25/4919 375/286 |
| 2003/0117184 A1* | 6/2003 | Fecteau | H03K 5/135 327/94 |
| 2004/0000924 A1 | 1/2004 | Best et al. | |
| 2004/0039504 A1 | 2/2004 | Coffee et al. | |
| 2004/0196076 A1* | 10/2004 | Ko | H04L 25/0272 327/112 |
| 2005/0012492 A1 | 1/2005 | Mihalka | |
| 2005/0053171 A1* | 3/2005 | Pickering | H04L 5/20 375/286 |
| 2005/0144225 A1 | 6/2005 | Anderson et al. | |
| 2005/0151868 A1 | 7/2005 | Fraenkel et al. | |
| 2005/0156755 A1 | 7/2005 | Miller | |
| 2005/0204057 A1* | 9/2005 | Anderson | H04L 29/06027 709/236 |
| 2006/0034326 A1 | 2/2006 | Anderson et al. | |
| 2006/0061494 A1* | 3/2006 | Hosaka | H03M 5/16 341/50 |
| 2006/0192697 A1 | 8/2006 | Quick et al. | |
| 2006/0271678 A1 | 11/2006 | Jessup et al. | |
| 2006/0274852 A1 | 12/2006 | Trachewsky et al. | |
| 2007/0009018 A1 | 1/2007 | Wang | |
| 2007/0030881 A1* | 2/2007 | Nishio | H04B 1/707 375/130 |
| 2007/0160155 A1* | 7/2007 | Choi | H04L 25/085 375/257 |
| 2007/0164883 A1* | 7/2007 | Furtner | G06F 13/4295 341/126 |
| 2007/0164884 A1 | 7/2007 | Ihs | |
| 2007/0192541 A1 | 8/2007 | Balasubramonian et al. | |
| 2008/0036526 A1 | 2/2008 | Wu et al. | |
| 2008/0212709 A1* | 9/2008 | Wiley | H04L 5/20 375/286 |
| 2008/0219252 A1* | 9/2008 | Narasimhaprasad | H04L 12/2803 370/389 |
| 2009/0082056 A1 | 3/2009 | Iwanaga et al. | |
| 2009/0195699 A1* | 8/2009 | Hamada | H04L 25/0272 348/721 |
| 2009/0225873 A1* | 9/2009 | Lee | H04L 25/0272 375/257 |
| 2010/0027706 A1* | 2/2010 | Tanimoto | H04L 25/0272 375/279 |
| 2010/0215118 A1 | 8/2010 | Ware et al. | |
| 2010/0235673 A1 | 9/2010 | Abbasfar | |
| 2010/0309964 A1* | 12/2010 | Oh | G06F 13/4243 375/219 |
| 2011/0084737 A1 | 4/2011 | Oh et al. | |
| 2011/0138210 A1 | 6/2011 | Belali et al. | |
| 2011/0268225 A1* | 11/2011 | Cronie | H04L 25/0272 375/296 |
| 2011/0294359 A1 | 12/2011 | Cho et al. | |
| 2011/0299555 A1 | 12/2011 | Cronie et al. | |
| 2011/0302478 A1 | 12/2011 | Cronie et al. | |
| 2012/0051241 A1 | 3/2012 | Mori et al. | |
| 2012/0135696 A1 | 5/2012 | Lerzer et al. | |
| 2012/0155565 A1* | 6/2012 | Wiley | H04L 5/20 375/288 |
| 2012/0230626 A1 | 9/2012 | Metz et al. | |
| 2013/0051162 A1 | 2/2013 | Amirkhany et al. | |
| 2013/0215991 A1* | 8/2013 | Wiley | H04L 5/20 375/288 |
| 2013/0241759 A1 | 9/2013 | Wiley et al. | |
| 2013/0339507 A1 | 12/2013 | Wiley | |
| 2014/0003543 A1* | 1/2014 | Wiley | H04L 25/02 375/259 |
| 2014/0006649 A1 | 1/2014 | Wiley et al. | |
| 2014/0112401 A1* | 4/2014 | Wiley | H04L 25/0272 375/259 |
| 2014/0153665 A1* | 6/2014 | Wiley | H04L 5/20 375/288 |
| 2014/0254733 A1 | 9/2014 | Sengoku et al. | |
| 2014/0270026 A1 | 9/2014 | Sengoku et al. | |
| 2015/0043693 A1* | 2/2015 | Lee | G06F 13/36 375/354 |
| 2015/0074673 A1* | 3/2015 | Tohzaka | G06F 9/46 718/103 |
| 2015/0236844 A1* | 8/2015 | Pan | H04L 7/0008 370/503 |
| 2015/0319013 A1* | 11/2015 | Wiley | H04L 5/20 375/257 |
| 2016/0034416 A1* | 2/2016 | Chavez | H04B 3/542 381/59 |
| 2016/0036916 A1* | 2/2016 | Takeda | H04L 67/12 702/89 |
| 2016/0041941 A1* | 2/2016 | Kessler | H04B 3/542 700/3 |
| 2016/0099817 A1* | 4/2016 | Wiley | H04L 5/20 375/288 |
| 2016/0156457 A1 | 6/2016 | Wiley | |
| 2017/0041130 A1 | 2/2017 | Wiley et al. | |
| 2017/0116150 A1* | 4/2017 | Wiley | G06F 13/4282 |
| 2017/0117979 A1* | 4/2017 | Sengoku | H04J 3/0605 |
| 2017/0118039 A1* | 4/2017 | Wiley | G06F 13/42 |
| 2017/0264379 A1* | 9/2017 | Wiley | H04L 25/03273 |
| 2017/0309167 A1* | 10/2017 | Wiley | H04L 25/0272 |
| 2018/0006846 A1* | 1/2018 | Wiley | H04L 25/0272 |
| 2018/0006851 A1 | 1/2018 | Wiley | |

FOREIGN PATENT DOCUMENTS

| | | |
|---|---|---|
| CN | 100541599 C | 9/2009 |
| CN | 101171776 B | 5/2011 |
| EP | 1207649 | 5/2002 |
| JP | 2000353035 A | 12/2000 |
| JP | 2002199032 A | 7/2002 |
| JP | 2005518733 A | 6/2005 |
| WO | 9202988 A1 | 2/1992 |

(56) References Cited

FOREIGN PATENT DOCUMENTS

| WO | WO-03071812 A2 | 8/2003 |
|---|---|---|
| WO | 2005041164 A1 | 5/2005 |
| WO | 08109478 | 9/2008 |
| WO | WO-2008109478 A2 | 9/2008 |
| WO | 2009111208 | 9/2009 |
| WO | 2011134678 A1 | 11/2011 |
| WO | 2011151469 A1 | 12/2011 |
| WO | 2012089803 A2 | 7/2012 |

OTHER PUBLICATIONS

International Preliminary Report on Patentability—PCT/US2013/045404, The International Bureau of WIPO—Geneva, Switzerland, dated Dec. 24, 2014 (120861WO).
Hsueh, "Crosstalk Suppression Technique for Multi-Wire High-Speed I/O Links," ProQuest Dissertations and Theses; 2010; UCLA, 189 pages.
International Preliminary Report on Patentability—PCT/US2013/048758—The International Bureau of WIPO Geneva, Switzerland, dated Oct. 7, 2014 (121559WO).
International Preliminary Report on Patentability—PCT/US2013/048989, The International Bureau of WIPO—Geneva, Switzerland, dated Oct. 7, 2004 (121559U2WO).
International Search Report and Written Opinion—PCT/US2008/055566, International Search Authority—European Patent Office—dated Nov. 24, 2008.
International Search Report and Written Opinion—PCT/US2013/030937—ISA/EPO—dated Jul. 4, 2013 (121284WO).
International Search Report and Written Opinion—PCT/US2013/045404—ISA/EPO—dated Sep. 12, 2013 (120861WO).
International Search Report and Written Opinion—PCT/US2013/048758—ISA/EPO—dated Aug. 16, 2013 (121559WO).
International Search Report and Written Opinion—PCT/US2013/048989—ISAEPO—dated Jan. 23, 2014 (121559U2WO).
International Search Report and Written Opinion—PCT/US2014/067463—ISA/EPO—dated Apr. 16, 2015 (061289C1C1B1WO).
International Search Report—PCT/US2009/034943, International Search Authority—European Patent Office Jun. 24, 2009 (072402WO).
Poulton J W., et al., "Multiwire Differential Signaling", Aug. 6, 2003 No. 1.1 Aug. 6, 2003 {Aug. 6, 2003), pp. 1-20, XP002610849, Retrieved from the Internet: URL:http://www.cs.unc.eduf-jpfmwire.pdf [retrieved on Nov. 23, 2010] the whole document.
Sevanto, J., "Multimedia messaging service for GPRS and UMTS", IEEE on WCNC, Sep. 1999, pp. 1422-1426, vol. 3.
Taiwan Search Report—TW098107168—TIPO—dated May 10, 2012 (072402TW).
Taiwan Search Report—TW102121240—TIPO—dated Feb. 13, 2014 (120861TW).
Written Opinion—PCT/Us2009/034943, International Search Authority—European Patent Office Jun. 24, 2009 (072402WO).
Zheng, "Skew compensation techniques for multi-gigabit wire-line data communications," Dissertation, The University of Texas at Dallas, 2010, 126 pages.
Zogopoulos, "A Low-Power High-Speed Single-Ended Parallel Link Using Three-Level Differential Encoding," USC, Dissertation, May 2007, 92 pages.

* cited by examiner

N-PHASE PHASE AND POLARITY ENCODED SERIAL INTERFACE

RELATED APPLICATIONS

The present Application for Patent is a continuation of U.S. Utility patent application Ser. No. 14/966,236, filed Dec. 11, 2015, which is a division of U.S. Utility patent application Ser. No. 14/090,625, filed Nov. 26, 2013, which is a continuation-in-part of U.S. Utility patent application Ser. No. 13/826,546, filed Mar. 14, 2013 and issued as U.S. Pat. No. 9,083,598 on Jul. 14, 2015, which was a continuation-in-part of U.S. Utility patent application Ser. No. 13/301,454, filed Nov. 21, 2011 and issued as U.S. Pat. No. 8,472,551, on Jun. 25, 2013, which was a continuation of U.S. Utility patent application Ser. No. 11/712,941, filed Mar. 2, 2007 and issued as U.S. Pat. No. 8,064,535, on Nov. 22, 2011, which applications are assigned to the assignee hereof and are hereby expressly incorporated by reference herein, and the present Application is a continuation-in-part of U.S. patent application Ser. No. 13/797,272 entitled "N-Phase Polarity Data Transfer" filed Mar. 12, 2013, which application is assigned to the assignee hereof and hereby expressly incorporated by reference herein, and which was a non-provisional application of U.S. Provisional Application No. 61/666,197 filed Jun. 29, 2012 and of U.S. Provisional Application No. 61/612,174 filed Mar. 16, 2012, and the present Application is a continuation-in-part of U.S. patent application Ser. No. 13/662,076 entitled "Three-Phase-Polarity Safe Reverse Link Shutdown" filed Oct. 26, 2012, which issued as U.S. Pat. No. 9,112,815 on Aug. 18, 2015, which claims priority from U.S. Provisional Application No. 61/660,664 entitled "Three-Phase-Polarity Safe Reverse Link Shutdown" filed Jun. 15, 2012, which applications are assigned to the assignee hereof and are hereby expressly incorporated by reference herein, and the present Application is a continuation-in-part of U.S. patent application Ser. No. 13/933,090 entitled "N-Phase Polarity Output Pin Mode Multiplexer" filed Jul. 1, 2013, which issued as U.S. Pat. No. 9,143,362 on Sep. 22, 2015, which application is assigned to the assignee hereof and is hereby expressly incorporated by reference herein, and which was a non-provisional application of U.S. Provisional Application No. 61/666,197 filed Jun. 29, 2012.

BACKGROUND

Field

The present disclosure relates generally to high-speed data communications interfaces, and more particularly, multi-wire, multi-phase data communication links.

Background

In the field of high-speed serial communication, demand for ever-increasing data rates continues to grow. Many conventional high-speed serial interface systems use non-return to zero (NRZ) data encoding with separate data and clock signals. This separation of the data and clock signals, however, typically results in skew between the two signals, limiting the maximum possible link data rate of the interface.

Typically, de-skewing circuitry is used at the receiving end of the serial interface to eliminate skew between the data and the clock signals. Consequently, both the real estate requirements and the link start-up time of the serial interface are increased, with the latter becoming disadvantageous when the interface is being used intermittently at a low duty cycle to minimize system power consumption.

Other conventional serial interface systems are more immune to skew by using data and strobe signals, but still suffer from skew problems when operating at high speeds.

Additionally, certain integrated receiver devices are typically built with slower logic because they have larger feature sizes in order to drive high voltages. This is the case, for example, for integrated liquid crystal display (LCD) Controller-Driver circuits that are used to drive LCD panels. As such, it would be difficult to implement a high-speed serial interface for such devices using conventional systems.

What is needed therefore is a high-speed serial interface that resolves the above-described problems of conventional serial interface systems. Further, a high-speed serial interface with increased capacity and reduced power consumption relative to conventional systems is needed.

SUMMARY

Embodiments disclosed herein provide systems, methods and apparatus that enable improved transmission rates on physical interfaces between devices within an apparatus. The apparatus may comprise a mobile terminal having multiple Integrated Circuit (IC) devices, which may be collocated in an electronic apparatus and communicatively coupled through one or more data links.

In an aspect of the disclosure, a method for data communications, includes steps of encoding data in multi-bit symbols, and transmitting the multi-bit symbols on a plurality of connectors. Transmitting the multi-bit symbols may include mapping the multi-bit symbols to a sequence of states of the plurality of connectors, and driving the connectors in accordance with the sequence of states. The timing of the sequence of states may be determinable at a receiver at each transition between sequential states. The state of each connector may be defined by polarity and direction of rotation of a multi-phase signal transmitted on the each connector.

In an aspect of the disclosure, the multi-phase signal carried on each connector is phase-shifted with respect to the multi-phase signal carried on the other connectors. for each state in the sequence of states.

In an aspect of the disclosure, the state of at least one of the plurality of connectors changes at each transition between the sequence of states.

In an aspect of the disclosure, the plurality of connectors include a plurality of wires. The multi-bit symbols may be transmitted on the plurality of connectors by leaving a first wire undriven providing a voltage differential between a second wire and a third wire during a first of two sequential time intervals, and leaving the second wire undriven and providing the voltage differential between the first wire and the third wire during a second of the two sequential time intervals. During the second of the two sequential time intervals, the polarity of the voltage differential may be reversed. At least one of the plurality of wires is undriven during each of the sequential time intervals. At least one of a change of polarity of the voltage differential and a change of wire that is undriven occurs at each transition between the sequence of states.

In an aspect of the disclosure, one of the plurality of wires may be left undriven by being open-circuited. A wire may be left undriven by causing the wire to transition toward a voltage level that lies substantially halfway between voltage levels of a pair of driven wires.

In an aspect of the disclosure, there is no significant current flow through an undriven wire.

In an aspect of the disclosure, the multi-phase signal transmitted on each connector includes one of two three-phase signals that have different phase rotation directions.

In an aspect of the disclosure, the multi-phase signal transmitted on each connector is a three-phase signal. The plurality of connectors may include three or more connectors.

In an aspect of the disclosure, the plurality of connectors may include two groups of three connectors. Different symbols may be encoded on each group of three connectors.

In an aspect of the disclosure, the plurality of connectors may include four or more connectors. Each symbol may be encoded for transmission using the four or more connectors.

In an aspect of the disclosure, an apparatus for data communications includes means for encoding data in multi-bit symbols, and means for transmitting the multi-bit symbols on a plurality of connectors. The means for transmitting may be configured to map the multi-bit symbols to a sequence of states of the plurality of connectors, and drive the connectors in accordance with the sequence of states. The timing of the sequence of states may be determinable at a receiver at each transition between sequential states. The state of each connector may be defined by polarity and direction of rotation of a multi-phase signal transmitted on the each connector.

In an aspect of the disclosure, an apparatus that encodes data includes an encoder configured to encode data in multi-bit symbols, a mapper configured to map the multi-bit symbols to a sequence of states for transmitting on a plurality of connectors, and one or more drivers configured to transmit the multi-bit symbols on the plurality of connectors, by driving the connectors in accordance with the sequence of states. The timing of the sequence of states is determinable at a receiver at each transition between sequential states. The state of each connector may be defined by polarity and direction of rotation of a multi-phase signal transmitted on the each connector.

In an aspect of the disclosure, a non-transitory machine-readable storage medium has instructions stored thereon for encoding data. The instructions, when executed by at least one processor may cause the at least one processor to encode data in multi-bit symbols, and transmit the multi-bit symbols on a plurality of connectors. The multi-bit symbols may be transmitted by mapping the multi-bit symbols to a sequence of states of the plurality of connectors, and driving the connectors in accordance with the sequence of states. The timing of the sequence of states is determinable at a receiver at each transition between sequential states. The state of each connector may be defined by polarity and direction of rotation of a multi-phase signal transmitted on the each connector.

DETAILED DESCRIPTION

Various aspects are now described with reference to the drawings. In the following description, for purposes of explanation, numerous specific details are set forth in order to provide a thorough understanding of one or more aspects. It may be evident, however, that such aspects may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
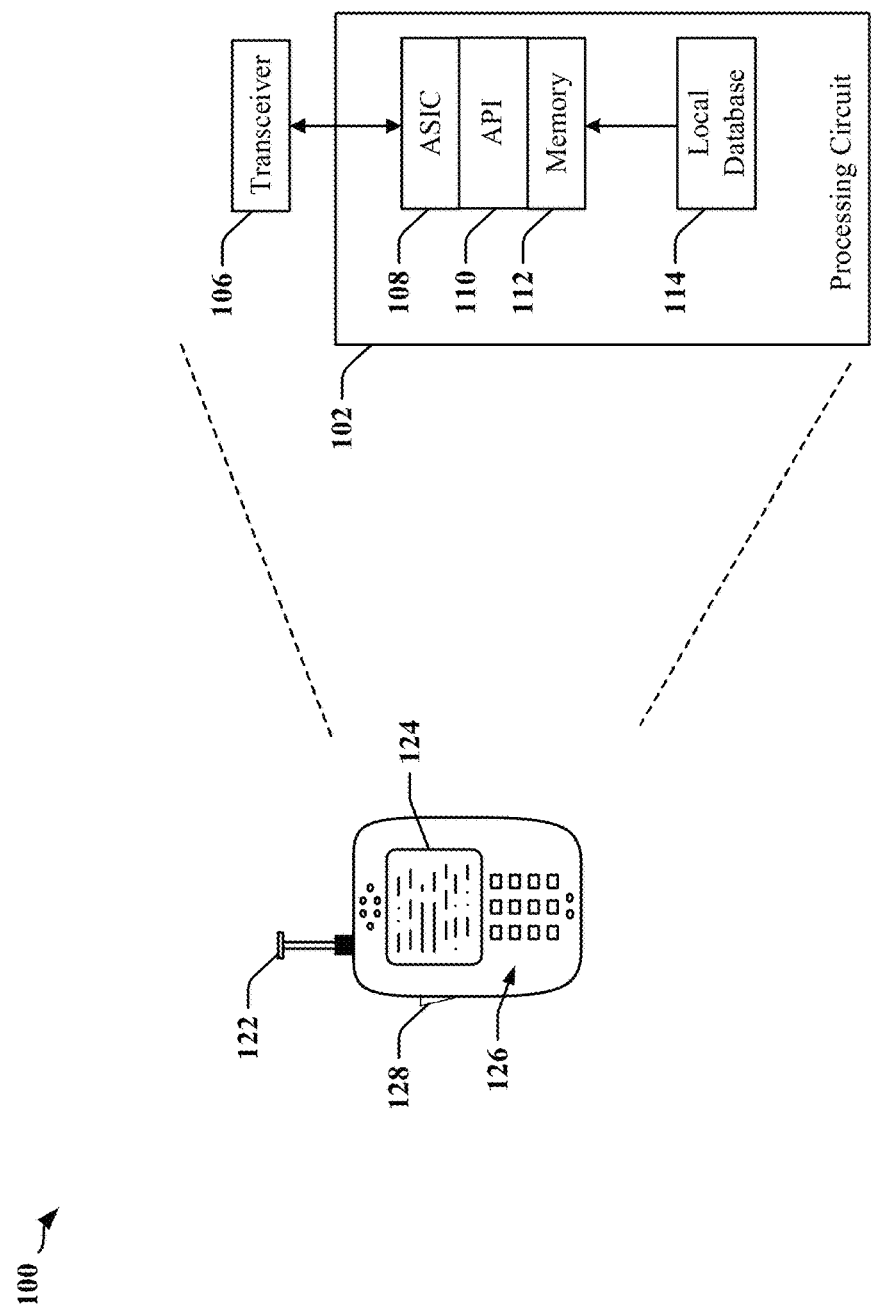
FIG. 1 depicts an apparatus employing a data link between IC devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between IC devices. In one example, the apparatus 100 may comprise a wireless communication device that communicates through a radio frequency (RF) transceiver with a radio access network (RAN), a core access network, the Internet and/or another network. The apparatus 100 may include a communications transceiver 106 operably coupled to a processing circuit 102. The processing circuit 102 may comprise one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data the may be executed by processing circuit 102. The processing circuit 102 may be controlled by one or more of an operating system and an application programming interface (API) layer 110 that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, display 124, operator controls, such as a button 128 and a keypad 126 among other components.

Figure 2:
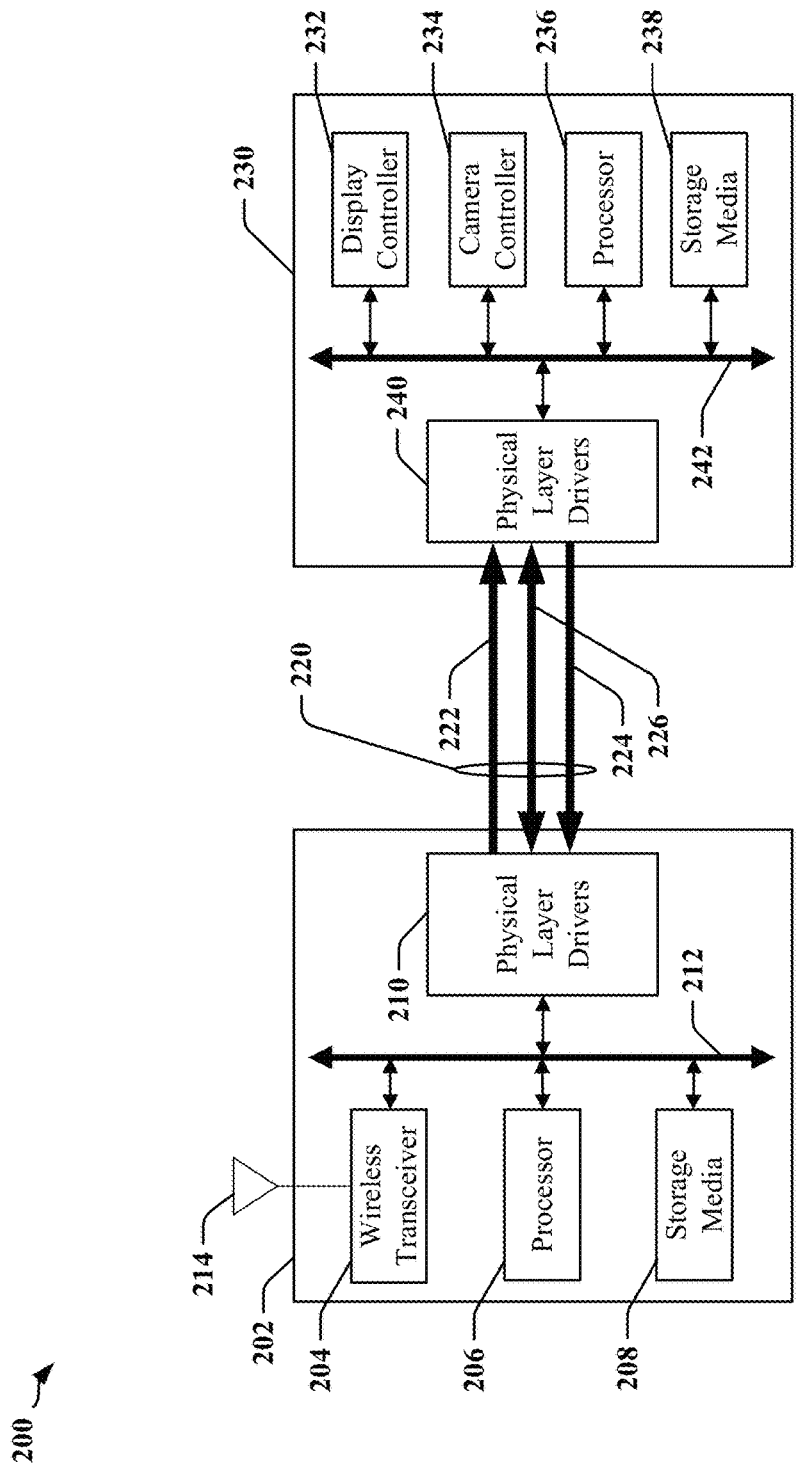
FIG. 2 illustrates a system architecture for an apparatus employing a data link between IC devices that selectively operates according to one of plurality of available standards.

FIG. 2 is a schematic block diagram illustrating certain aspects of an apparatus 200 such as a wireless mobile device, a mobile telephone, a mobile computing system, a wireless telephone, a notebook computer, a tablet computing device, a media player, a gaming device, or the like. The apparatus 200 may comprise a plurality of IC devices 202 and 230 that exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may be configured to have multiple communications channels 222, 224 and 226. One or more communications channel 226 may be bidirectional, and may operate in half-duplex and/or full-duplex modes. One or more communications channel 222 and 224 may be unidirectional. The communication link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each comprise a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. Display controller 232 may comprise circuits and software drivers that support displays such as a liquid crystal display (LCD) panel, touch-screen display, indicators and so on. The storage media 208 and 238 may comprise transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222, and reverse link 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate control, command and other information between the first IC device 202 and the second IC device 230 in accordance with an industry or other standard.

Industry standards may be application specific. In one example, the Mobile Industry Processor Interface Alliance (MIPI) standard defines physical layer interfaces including a synchronous interface specification (D-PHY) between an application processor IC device 202 and an IC device 230 that supports the camera or display in a mobile device. The D-PHY specification governs the operational characteristics of products that comply with MIPI specifications for mobile devices. A D-PHY interface may support data transfers using a flexible, low-cost, high-speed serial interface that interconnects between components 202 and 230 within a mobile device. These interfaces may comprise complimentary metal-oxide-semiconductor (CMOS) parallel busses providing relatively low bit rates with slow edges to avoid electromagnetic interference (EMI) issues.

The communication link 220 of FIG. 2 may be implemented as a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links 220.

N-phase polarity encoding devices 210 and/or 240 can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

According to certain aspects disclosed herein, data and clock information may be jointly encoded and/or timing information may be embedded in the data signal in order to eliminate skew between data and clock signals and thereby render de-skewing circuitry unnecessary in a serial interface. For example, a differential data encoding scheme may be used, whereby data and clock information are jointly encoded in state transitions of a single signal. The majority of differential data encoding schemes employ level differential schemes, whereby state transitions are defined in terms of changes in the level or magnitude of the data and clock signal.

Figure 3:
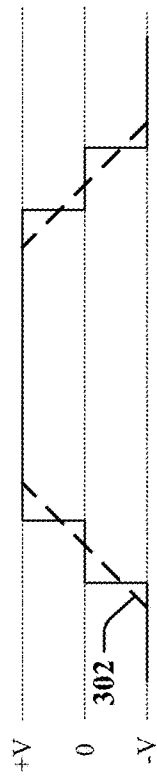
FIG. 3 illustrates transitions in a 3-level differential data encoding scheme.
Figure 3:
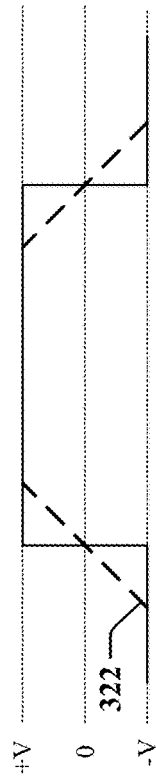

FIG. 3 includes timing diagrams 300 and 320 that illustrate certain transitions in a 3-level differential data encoding scheme. In the examples shown in the diagrams 300 and 320, a signal voltage level transition from −V to 0 is a logic 0, from −V to +V is a logic 1, from 0 to −V is a logic 0, from 0 to +V is a logic 1, from +V to 0 is a logic 1, and from +V to −V is a logic 0.

In the first diagram 300, the signal level transitions from −V to +V, including a first transition from −V to 0 followed by a second transition from 0 to +V, such that a "01" data sequence is transmitted. In the second diagram 320, the signal level transitions from −V to +V to transmit a logic "1." However, as shown by the dotted lines representing positive transitions 302 and 322, for example, the signal slew rate may be slow compared with the response time of the data recovery circuitry at the receiving end, and both transitions 302 and 304 can appear identical and can be interpreted as "01" by the recovery circuitry. Similar transition decoding problems occur on +V to −V transitions, or when the slew rate is faster than the response time of the data recovery circuit. This ambiguity in decoding state transitions is due to having transitions that must pass through intermediate states in order to reach a desired state. However, a differential data encoding scheme with "circular" state transitions may resolve ambiguous state transitions in differential data encoding schemes.

Figure 4:
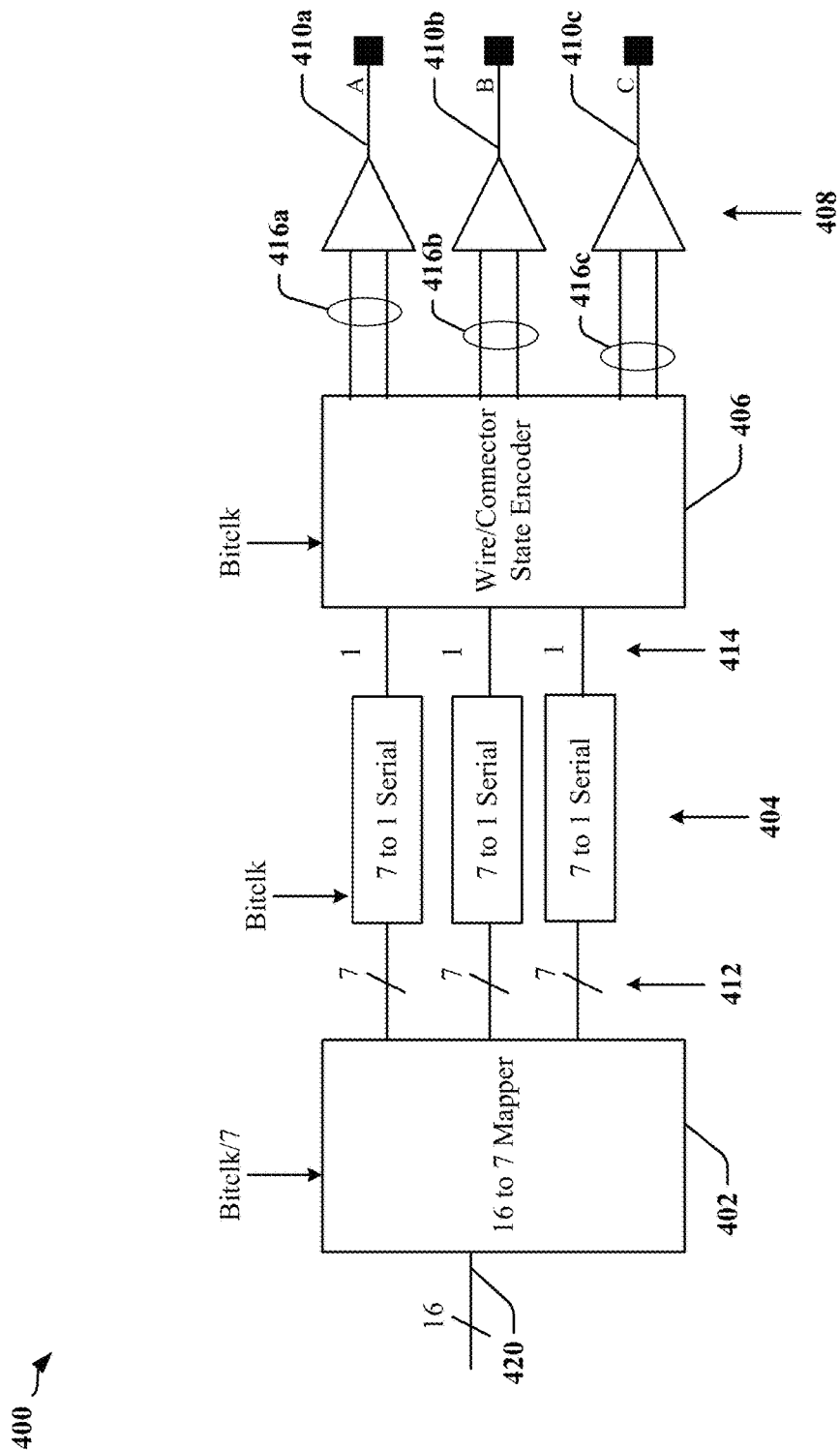
FIG. 4 illustrates an N-phase polarity data encoder.

FIG. 4 is a schematic diagram 400 illustrating an M-wire, N-phase polarity encoder that may be used to implement certain aspects of the communication link 220 depicted in FIG. 2. In the example depicted, the M-wire, N-phase polarity encoder transmitter is configured to transmit information using M=3 wires and N=3 phase signaling. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the M wires in an M-wire, N-phase polarity encoding scheme may include an undriven state, a positively driven state and a negatively driven state. Signaling states defined for a 3-wire, 3-phase polarity encoding scheme may be denoted using the three voltage or current states (+1, −1, and 0). In the 3-wire, 3-phase polarity encoding scheme, the positively driven state and the negatively driven state may be obtained by providing a voltage differential between two of the signal wires 410*a*, 410*b* and/or 410*c*, and/or by driving a current through two of the signal wires 410*a*, 410*b* and/or 410*c* connected in series such that the current flows in different directions in the two signal wires 410*a*, 410*b* and/or 410*c*.

The undriven state may be realized by placing an output of a driver 408 of a signal wire 410*a*, 410*b* or 410*c* in a high-impedance mode. Alternatively, or additionally, an undriven state may be obtained on a signal wire 410*a*, 410*b* or 410*c* by passively or actively causing an "undriven" signal wire 410*a*, 410*b* or 410*c* to transition toward a voltage level that lies substantially halfway between positive and negative voltage levels provided on driven signal wires 410*a*, 410*b* and/or 410*c*. Typically, there is no significant current flow through an undriven signal wire 410*a*, 410*b* or 410*c*.

Figure 8:
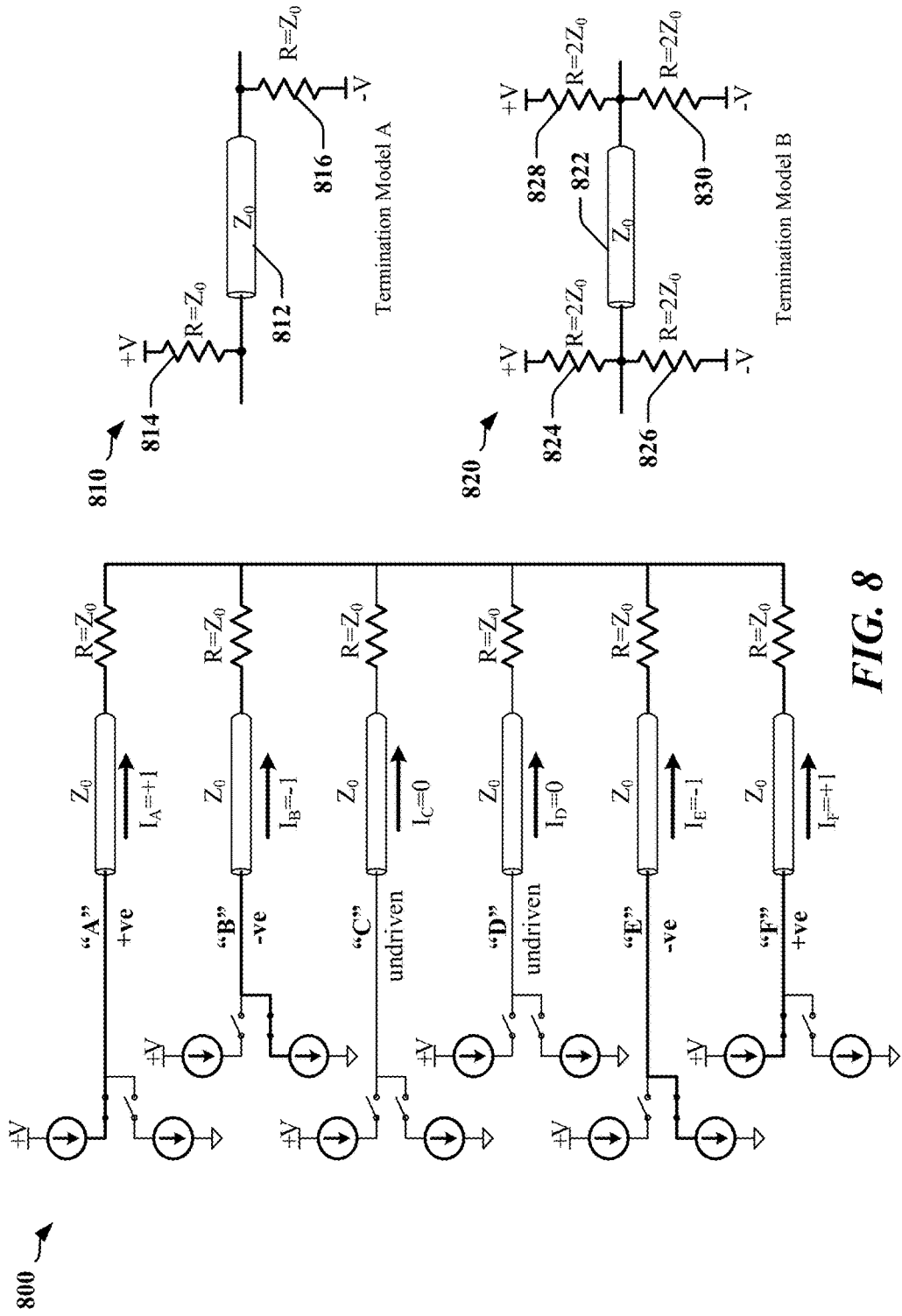
FIG. 8 includes models that characterize an example of an M-wire N-phase driver and that illustrate optional arrangements of transmission line terminations.

An undriven signal wire 410*a*, 410*b* or 410*c* need not be open-circuited. In some instances, a termination impedance may be provided to terminate one or more signal wires 410*a*, 410*b* and/or 410*c*. The signal wires 410*a*, 410*b* and/or 410*c* may be terminated by an impedance provided at a transmitting end and/or at a receiving end. The location and arrangement of termination impedances may be provided within, or external to the physical layer drivers 210 and/or 240 based on the configuration of the one or more signal wires 410*a*, 410*b* and/or 410*c*. The one or more signal wires 410*a*, 410*b* and/or 410*c* may be terminated with impedances calculated to match the characteristic impedance $Z_0$. FIG. 8 provides examples 810 and 820 showing options for location and arrangement of terminating impedances. Terminating impedances can be provided at one or both ends of the transmission line.

In one example 810, a terminating resistor 814 at the transmitting end of a transmission line 812 may pull an undriven signal wire 410*a*, 410*b* or 410*c* towards a first voltage, while a terminating resistor 816 at the receiving end of the transmission line 812 may pull an undriven signal wire 410*a*, 410*b* or 410*c* towards a second voltage, where the first and second voltages are different. The first and second voltages may include a ground (zero voltage) and a non-zero voltage, voltages that have different polarities and/or voltages that have the same polarity but different magnitudes.

In another example 820 shown in FIG. 8, pairs of terminating resistors 824, 826 and 828, 830 may be provided at one or both ends of a transmission line 822. The pair of resistors 824 and 826 at the transmitting end of the transmission line 822 may provide a combined impedance equal to the characteristic impedance $Z_0$ of the transmission line 822 and may be configured to pull an undriven signal wire 410*a*, 410*b* or 410*c* towards a mid-point between two voltage rails or towards the mid-point between a voltage rail and ground of the transmitter. The pair of resistors 828 and 830 at the receiving end of the transmission line 822 may provide a combined impedance equal to the characteristic impedance $Z_0$ of the transmission line 822 and may be configured to pull the undriven signal wire 410a, 410b or 410c towards the mid-point between two voltage rails or towards the mid-point between a voltage rail and ground of the receiver. Other configurations of terminating impedances may be used as determined by the characteristics of the communications link 220.

In some instances, terminating impedances may be omitted and the undriven signal wire 410a, 410b or 410c may be permitted to float. In some instances, the undriven signal wire 410a, 410b or 410c may be at least partially driven toward a mid-point voltage level by active circuits in a driver and/or receiver.

In the example illustrated in FIG. 4, a 3-wire, 3-phase polarity encoder may employ drivers 408 to control the signaling state of three connectors 410a, 410b and 410c (which may be wires, traces or other electrical conductors). The drivers 408 may be implemented as unit-level current-mode or voltage-mode drivers. In one example, each driver 408 may receive sets of two or more of signals 416a, 416b and 416c that determine the output state of corresponding connectors 410a, 410b and 410c. When each of the sets of signals 416a, 416b and 416c include a pair of signals, four states may be defined for the corresponding connectors 410a, 410b and 410c. When each of the sets of signals 416a, 416b and 416c include three signals, 8 states may be defined for corresponding connectors 410a, 410b and 410c.

For each transmitted symbol interval in an M-wire, N-phase polarity encoding scheme, at least one signal wire 410a, 410b or 410c is in the undriven (0) voltage or current state, while the number of positively driven (+1 voltage or current state) signal wires 410a, 410b or 410c is equal to the number of negatively driven (−1 voltage or current state) signal wires 410a, 410b or 410c, such that the sum of current flowing to the receiver is always zero. For each symbol, the state of at least one signal wire 410a, 410b or 410c is changed from the symbol transmitted in the preceding transmission interval.

In operation, a mapper 402 may receive and map 16 bit data 420 to 7 symbols 412. In the 3-wire example, each of the 7 symbols defines the states of the signal wires 410a, 410b and 410c for one symbol interval. The 7 symbols 412 may be serialized using parallel-to-serial converters 404 that provide a timed sequence of symbols 414 for each wire 410a, 410b and 410c. The sequence of symbols 414 is typically timed using a transmission clock. An M-wire phase encoder 406 receives the sequence of 7 symbols 412 produced by the mapper 402 and serialized by the parallel-to-serial converters 404 one symbol at a time and computes the state of each signal wire 410a, 410b and 410c for each symbol interval. The 3-wire encoder 406 selects the states of the signal wires 410a, 410b and 410c based on the current input symbol 414 and the previous states of signal wires 410a, 410b and 410c.

The use of M-wire, N-phase encoding permits a number of bits to be encoded in a plurality of symbols where the bits per symbol is not an integer. In the simple example of a 3-wire communications link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \approx 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 5:
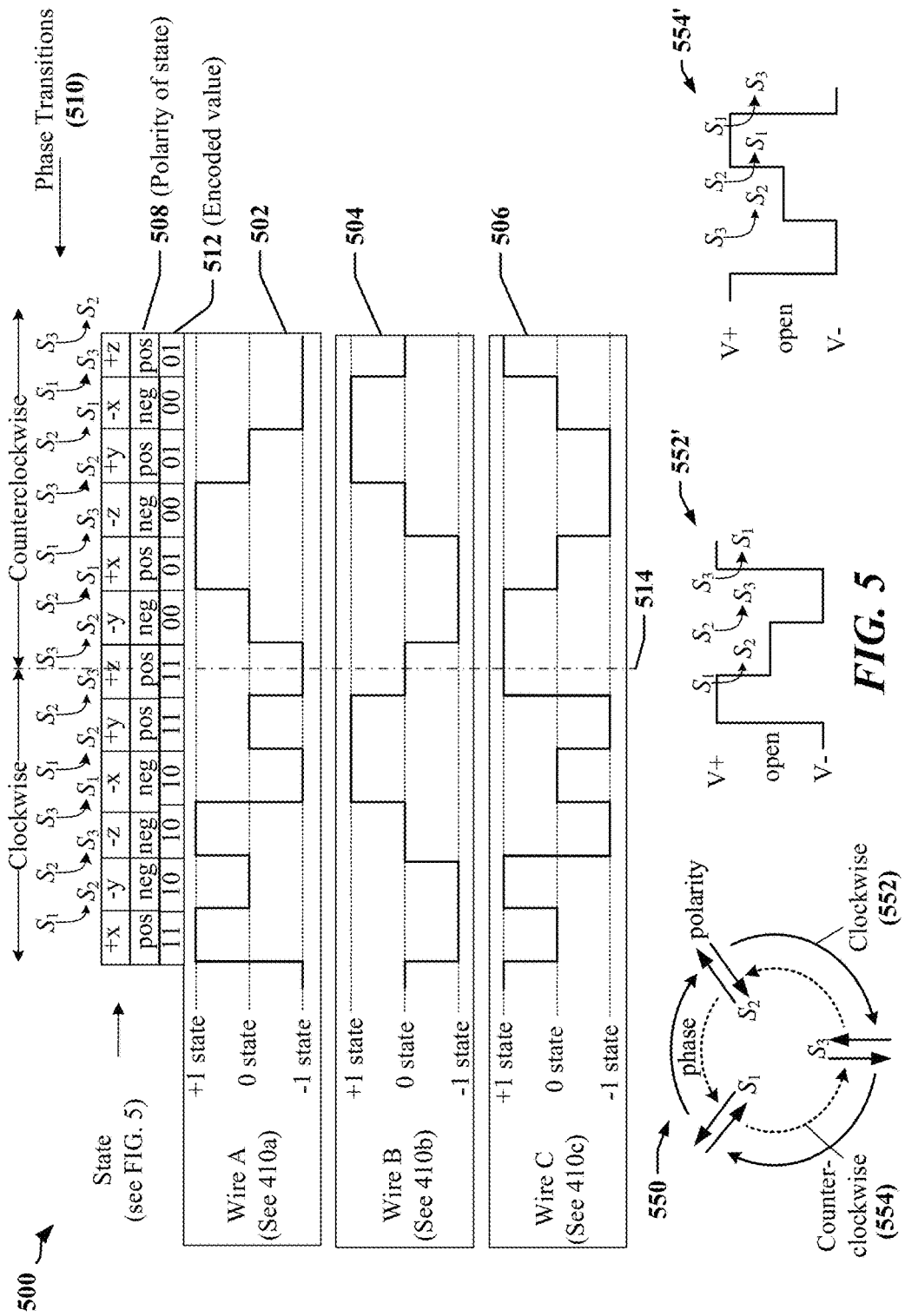
FIG. 5 illustrates signaling in an N-phase polarity encoded interface.

FIG. 5 includes a timing diagram 500 for signals encoded using a three-phase modulation data-encoding scheme, which is based on the circular state diagram 550. The three-phase modulation scheme is described by way of example and illustrates certain principles of operation that may be employed in other N-phase polarity encoding schemes, which may transmit signals over various configurations of M-wires. In the example, information may be encoded in a sequence of signaling states where, for example, a wire or connector is in one of three phase states $S_1$, $S_2$ and $S_3$ defined by the state diagram 550. Each state may be separated from the other states by a 120° phase shift. In one example, data may be encoded in the direction of rotation of phase states on the wire or connector. The phase states in a signal may rotate in clockwise direction 552 and 552' or counterclockwise direction 554 and 554'. In the clockwise direction 552 and 552' for example, the phase states may advance in a sequence that includes one or more of the transitions from $S_1$ to $S_2$, from $S_2$ to $S_3$ and from $S_3$ to $S_1$. In the counterclockwise direction 554 and 554', the phase states may advance in a sequence that includes one or more of the transitions from $S_1$ to $S_3$, from $S_3$ to $S_2$ and from $S_2$ to $S_1$. The three wires 410a, 410b and 410c (see FIG. 4) carry different versions of the same signal, where the versions are phase shifted by 120° with respect to one another. Each signaling state may be represented as a different voltage level on a wire or connector and/or a direction of current flow through the wire or connector 410a, 410b and/or 410c. During each of the sequence of signaling states in a 3-wire system, each wire 410a, 410b and 410c is in a different signaling states than the other wires 410a, 410b and 410c. When more than 3 wires 410a, 410b and 410c are used in a 3-phase encoding system, two or more wires 410a, 410b and/or 410c can be in the same signaling state at each signaling interval, although each state is present on at least one wire 410a, 410b and/or 410c in every signaling interval.

Information may be encoded in the direction of rotation at each phase transition 510, and the 3-phase signal may change direction for each signaling state. Direction of rotation may be determined by considering which wires 410a, 410b and/or 410c are in the '0' state before and after a phase transition, because the undriven wire 410a, 410b and/or 410c changes at every signaling state in a rotating three-phase signal, regardless of the direction of rotation.

The encoding scheme may also encode information in the polarity 508 of the two conductors 410a, 410b and 410c that are actively driven. At any time in a 3-wire implementation, exactly two of the conductors 410a, 410b, 410c are driven with currents in opposite directions and/or with a voltage differential. In a simple implementation, data 512 may be encoded using two bit values 512, where one bit is encoded in the direction of phase transitions 510 and the second bit is encoded in the polarity 508 for the current state.

The timing chart 500 illustrates data encoding using both phase rotation direction and polarity. The timing chart 500 includes curves that relate to signals 502, 504 and 506 carried on three wires 410a, 410b and 410c, respectively for multiple phase states. Initially, the phase transitions 510 are in a clockwise direction and the most significant bit is set to binary '1,' until the rotation of phase transitions 510 switches at a time 514 to a counterclockwise direction, as represented by a binary '0' of the most significant bit. The least significant bit reflects the polarity 508 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state. Accordingly, there may be $\log_2(5) \cong 2.32$ bits encoded per symbol (transition), which allows the mapper 402 to accept a 16-bit word and encode it in 7 symbols.

N-Phase data transfer may use more than three wires that are available or provided in a communication medium, such as a bus. The use of additional signal wires that can be driven simultaneously provides more available combinations of states and polarities, and allows more bits of data to be encoded at each transition between states. This can significantly improve throughput of the system, and reduce the power consumption over approaches that use multiple differential pairs to transmit data bits, while providing increased bandwidth.

Figure 6:
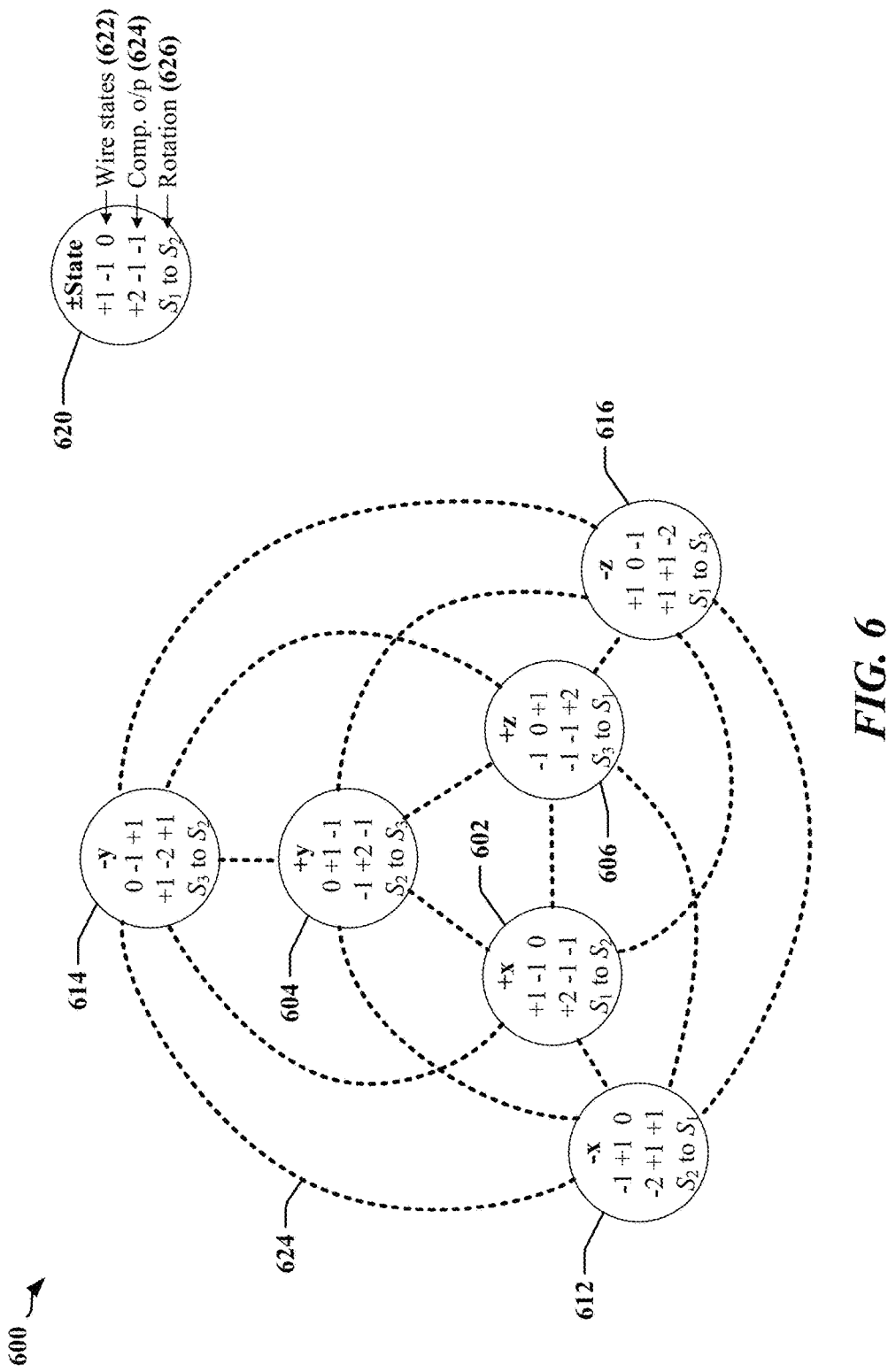
FIG. 6 is a state diagram illustrating potential state transitions in an M-wire N-phase polarity decoder.

FIG. 6 is a state diagram 600 illustrating 6 states and 30 possible state transitions in the example of a 3-wire, 3-phase communication link. FIG. 6 expands on the state transition diagram 550 in FIG. 5 by depicting all possible states 602, 604, 606, 612, 614 and 616. These states 602, 604, 606, 612, 614 and 616 include positive polarity and negative polarity versions of the phase states $S_1$, $S_2$ and $S_3$ illustrated in the phase transition diagram 550 of FIG. 5. For clarity, the set of phase/polarity states are labeled alphabetically and includes {+x, −x, +y, −y, +z, −z} where, for example, +x and −x represent states with the same phase state but different polarity. As shown in the model state element 620, each state 602, 604, 606, 612, 614 and 616 in the state diagram 600 includes a field 622 showing the voltage state of signals 502, 504 and 506, which are transmitted on wires 410a, 410b and 410c, respectively. For example, in state 602 (+x) signal 502=+1, signal 504=−1 and signal 506=0. Also shown in FIG. 6 are the 5 possible transition paths between the states 602, 604, 606, 612, 614 and 616, including by way of example, the transition path 624 between −x state 612 and −y state 614.

Figure 7:
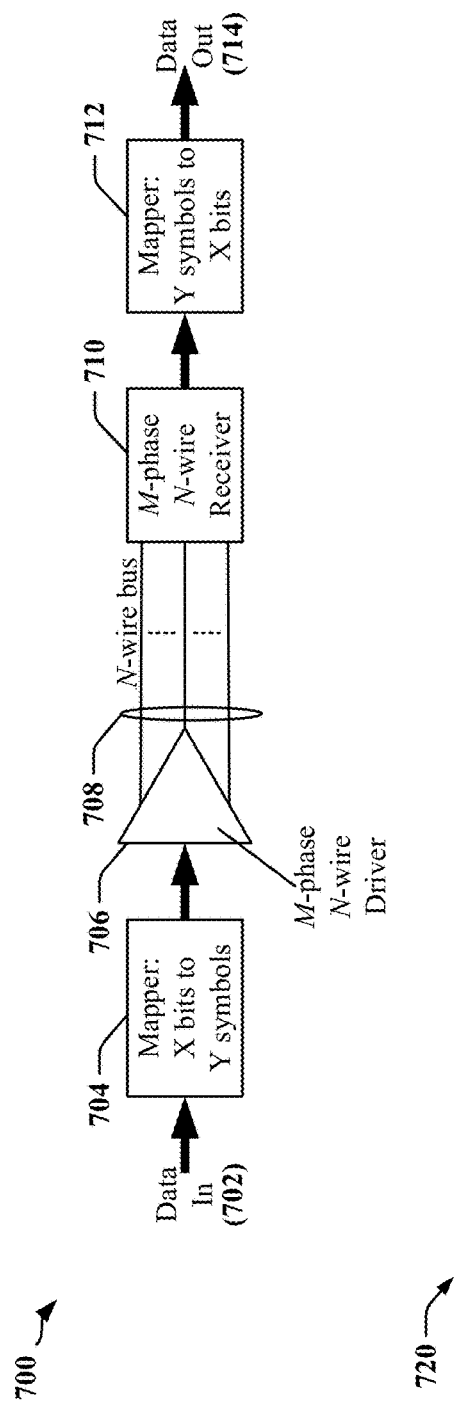
FIG. 7 illustrates certain aspects of an M-wire, N-phase encoding system and bit encoding capabilities of various M-wire, N-phase encoding systems.

FIG. 7 includes a schematic block diagram 700 illustrating certain aspects of an M-wire, N-phase encoding system and bit-encoding capabilities for various values of M and configurations of the M-wire, N-phase encoding system. Data received at a transmitter may be mapped to a number of symbols to be sequentially transmitted over an N-wire bus 708. The mapping scheme may determine a configuration for the N-wire bus 708. In one example, a plurality of connectors in the N-wire bus 708 may carry the same N-phase signal, shifted by a predetermined phase angle. In another example, the N-wire bus 708 may be subdivided into groups of G wires, where each group carries different N-phase signals. In the latter example, a 9-wire bus 708 may be configured as three different 3-wire bus segments. According to certain aspects, the mapper 704 may be adapted to dynamically define the encoding scheme, to reconfigure the N-wire bus 708 and to control the operation of the M-phase, N-wire driver 706. In one example, the mapper 704 may be adapted to reconfigure the M-wire, N-phase encoding system to provide a desired bandwidth and/or to limit power consumption. Thus, the mapper 704 may selectively enable and disable portions of the N-wire bus 708 when demand on data bandwidth is low, and the mapper 704 may enable additional portions of the N-wire bus 708 to obtain increased bandwidth.

At the receiver, N-phase symbols are received and accumulated from the N-wire bus 708, typically over a plurality of transmission clock cycles. The accumulated symbols may then be decoded by a symbol-to-bits mapper 712. Transmit clocks may be derived from one or more portions of the N-wire bus 708 and configuration information may be communicated using a designated group of connectors that provide a primary channel. In the example of the 9-wire bus 708 configured as three different 3-wire bus segments, one bus segment may be identified as the primary channel with a default encoding scheme to be used during power-up and synchronization. Commands communicated over the bus may cause the transmitter and receiver to enter a hibernate stage on one or more of the 3-wire segments.

N-Phase data transfer may use more than three signal wires or other connectors in provided in a communication medium. The use of additional signal wires that can be driven simultaneously provides more combinations of states and polarities and allows more bits of data to be encoded at each transition between states. This can significantly improve throughput of the system, while limiting power consumption as opposed to communications links that use multiple differential pairs to transmit data bits, while providing increased bandwidth. Power consumption can be further limited by dynamically configuring the number of active connectors for each transmission.

FIG. 8 is a schematic drawing showing a model of an encoder that transmits symbols using 6 wires with 2 pairs of wires driven for each state. The 6 wires may be labeled A through F, such that in one state, wires A and F are driven positive, wires B and E negative, and C and D are undriven (or carry no current). In the example the N-phase signal may have 3 phases. Each phase state can have either a positive or negative polarity. In the illustrative model, each wire may be connected to a positive current source, a negative current source, or no current source. Current flows through a wire having an impedance $Z_O$ that is typically the characteristic impedance of the transmission wire. As shown in FIG. 8, the two positive currents are canceled by two negative currents.

For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may comprise:

++-- +--+ +-+- -+-+ -++- --++

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right).$$

The table 720 shown in FIG. 7 illustrates bit encoding capabilities for various values of M (i.e. number of wires) and configurations of wires and wire pairs.

Figure 9:
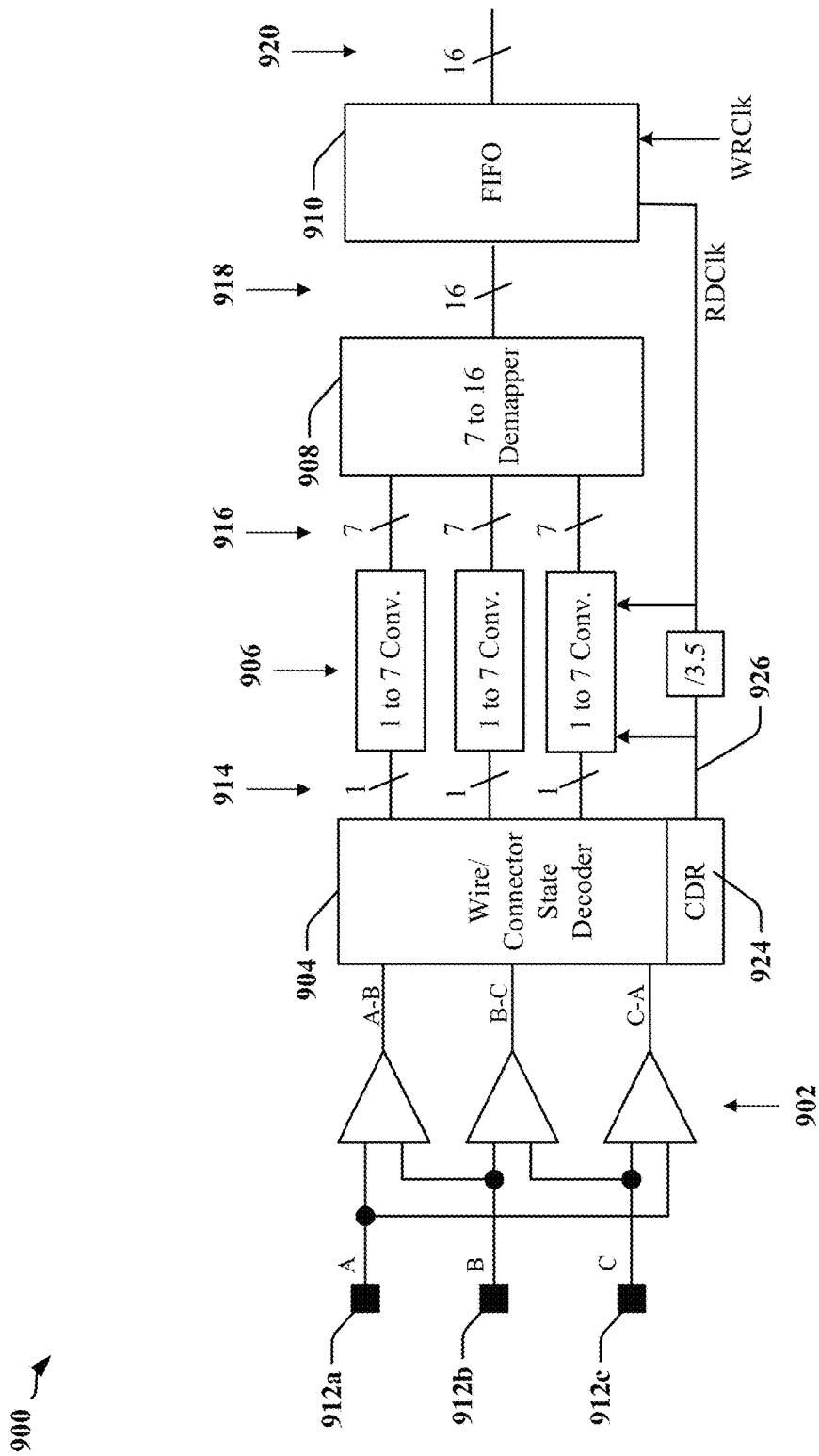
FIG. 9 illustrates an example of an N-phase polarity decoder.

FIG. 9 is a diagram 900 illustrating certain aspects of a 3-wire, 3-phase decoder. Differential receivers 902 and a wire state decoder 904 are configured to provide a digital representation of the state of the three transmission lines 912a, 912b and 912c, with respect to one another, and to detect changes in the state of the three transmission lines compared to the state transmitted in the previous symbol period. Seven consecutive states are assembled by the serial-to-parallel convertors 906 to obtain a set of 7 symbols to be processed by the demapper 908. The demapper 908 produces 16 bits of data that may be buffered in a first-in, first-out (FIFO) buffer 910.

The wire state decoder 904 may extract a sequence of symbols 914 from phase encoded signals received on the wires 912a, 912b and 912c. The symbols 914 are encoded as a combination of phase rotation and polarity as disclosed herein. The wire state decoder may include a clock and data recovery (CDR) circuit 924 that extracts a clock 926 that can be used to reliably capture symbols from the wires 912a, 912b and 912c. A transition occurs on least one of the wires 912a, 912b and 912c at each symbol boundary and the CDR circuit 924 may be configured to generate the clock 926 based on the occurrence of a single transition or multiple transitions. An edge of the clock may be delayed to allow time for all wires 912a, 912b and 912c to have stabilized and to thereby ensure that the current symbol is captured for decoding purposes.

Figure 10:
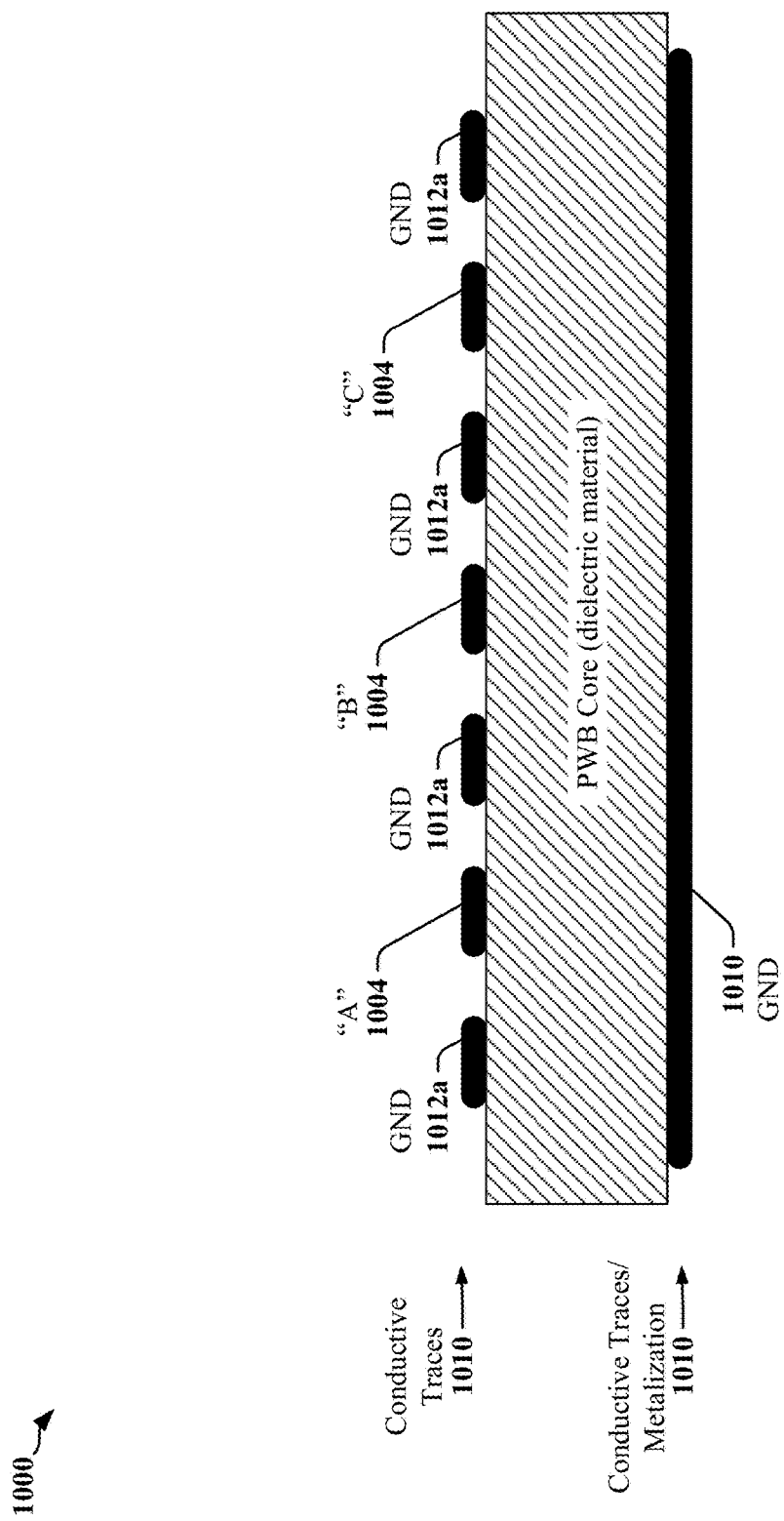
FIG. 10 illustrates a 3-wire example of connectors implemented on a printed wiring board.
Figure 11:
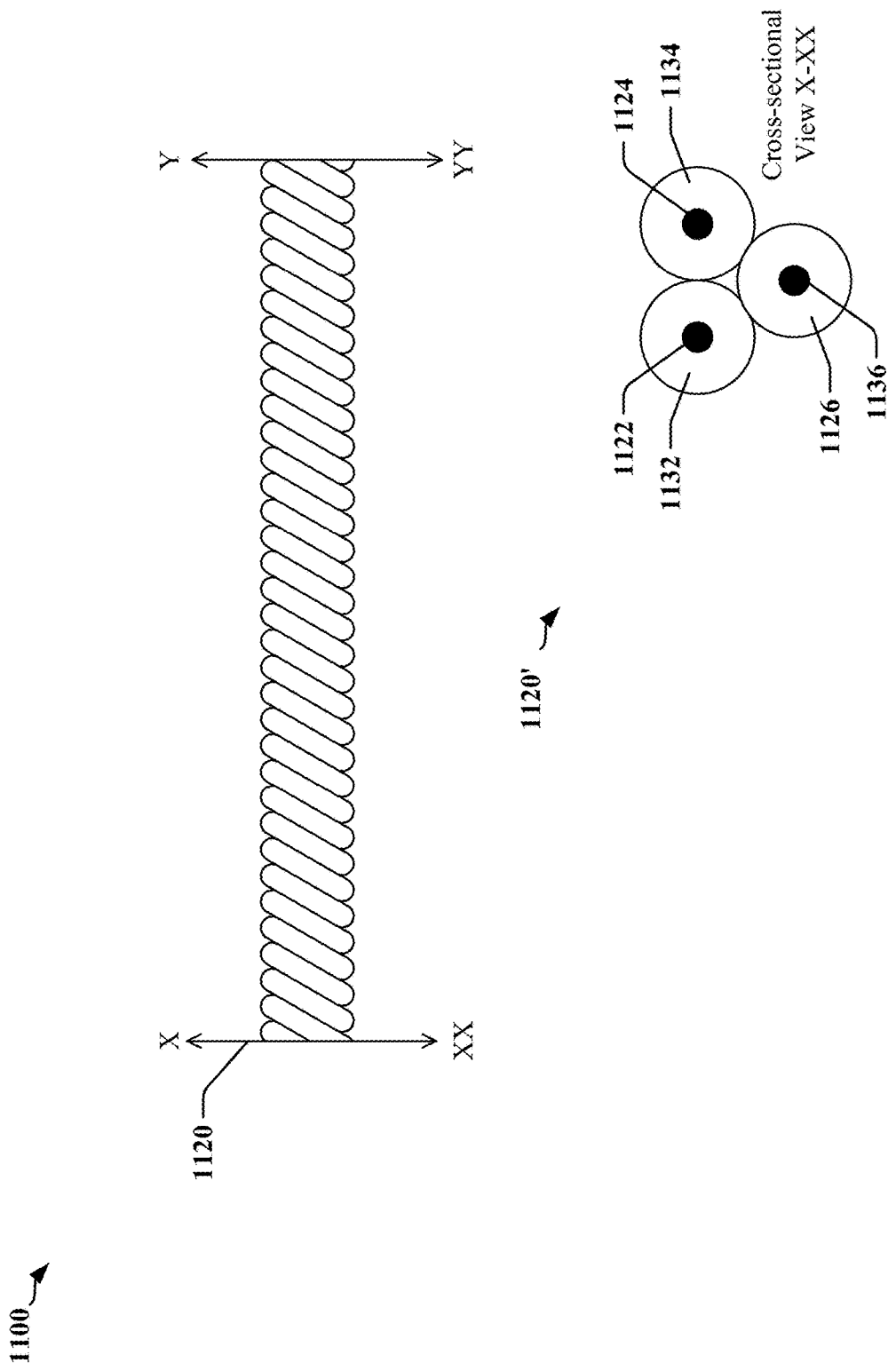
FIG. 11 illustrates a 3-wire example of connectors implemented using a twisted trio cable.

FIGS. 10 and 11 illustrate example serial interface implementations employing the three phase modulation data encoding schemes of the present invention. FIG. 10 illustrates an example of a 3-wire implementation 1000 on a printed wiring board. As shown, three conductors A, B, and C are interleaved with ground on an upper layer with a dielectric core separating them from ground in a lower layer. In one embodiment, the impedance from any conductor to ground has a value $Z_0$. FIG. 11 illustrates an example implementation 1100 using a twisted trio cable.

Figure 12:
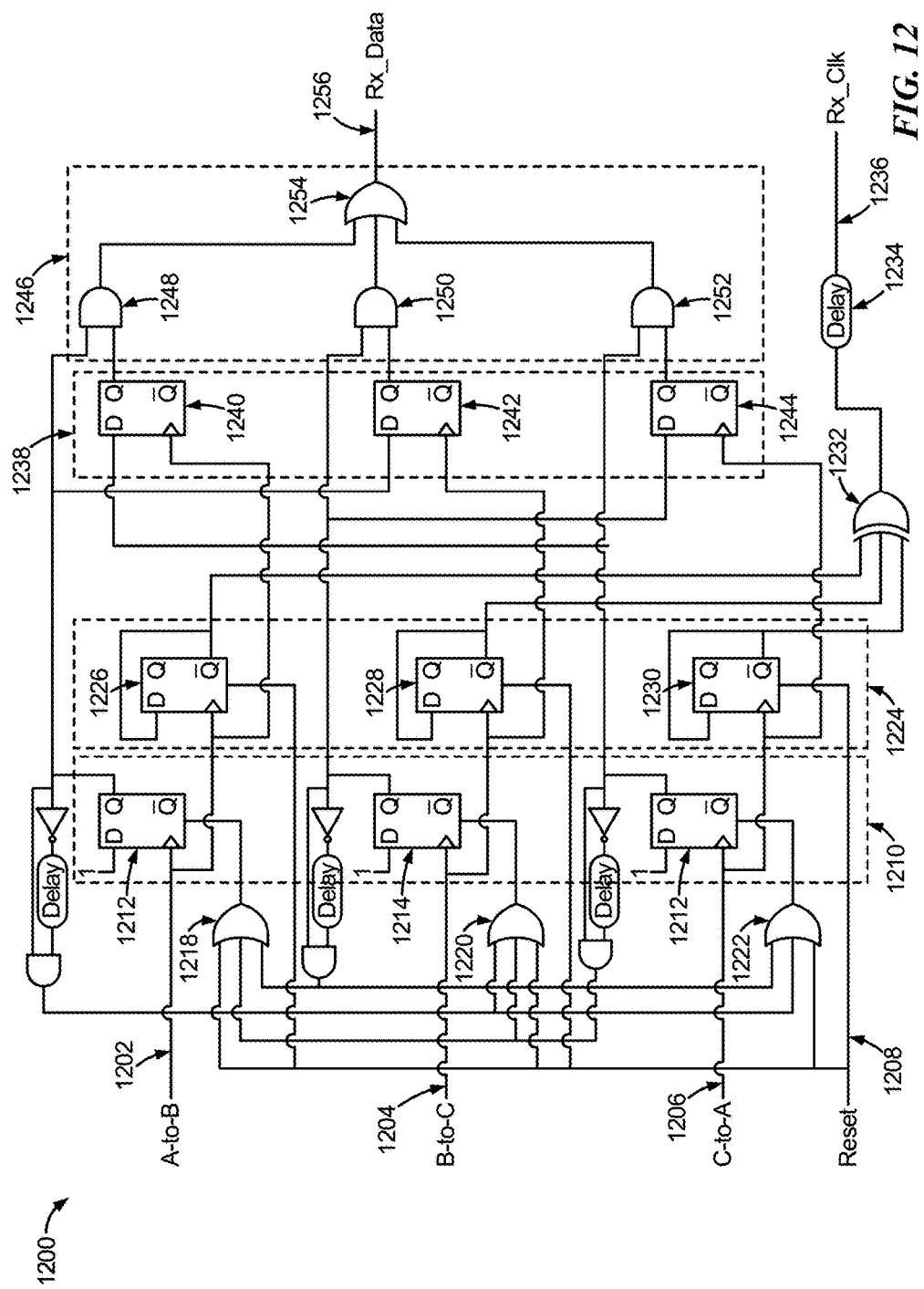
FIG. 12 illustrates an example of a clock and data recovery circuit used to decode data transmitted according to a three phase modulation data encoding scheme.

FIG. 12 illustrates an example CDR circuit 1200 which can be used to decode data transmitted according to a three phase modulation data encoding scheme. Other CDR circuit implementations and configurations may be adopted to suit different applications or meet different design goals, as will be understood by a person skilled in the art and based on certain aspects described herein.

The CDR circuit 1200 includes first, second, and third layers 1210, 1224, and 1238 of D flip flops and a multiplexer circuit 1246. The CDR circuit 1200 receives input signals A-to-B 1202, B-to-C 1204, and C-to-A 1206. At any time, exactly one of signals 1202, 1204, and 1206 is high, indicating the current encoding state being transmitted. The signals 1202, 1204, and 1206 are input respectively into first layer D flip flops 1212, 1214, and 1216.

A first layer of D flip flops 1212, 1214, and 1216 capture the most recent state transition as indicated by the signals 1202, 1204, and 1206. Note that each of the D flip flops 1212, 1214, and 1216 has its D data input coupled to a logic 1 and is set whenever its respective clock input 1202, 1204, or 1206 experiences a rising edge transition. Also note that whenever one of the D flip flops 1212, 1214, and 1216 is set, it asynchronously resets the other two first layer D flip flops. In one embodiment, this is done by coupling the Q output of each first layer D flip flop through a rising edge triggered pulse circuit to the reset inputs of the other two first layer D flip flops. For example, in the embodiment of FIG. 12, the Q output of D flip flop 1212 is coupled through OR gates 1220 and 1222 respectively to the reset inputs of the D flip flops 1214 and 1216. In one example, to ensure that the D flip-flops 1212, 1214, and 1216 are only reset momentarily when a non-respective state occurs, the Q outputs of the D flip-flops 1212, 1214, and 1216 are coupled to the OR gates 1218, 1220, and 1222 through a circuitry, which ensures that the OR gates 1218, 1220, and 1222 are only provided with a narrow positive pulse and not a continuous signal of value one. For example, the Q output of the D flip-flop 1212 is coupled to the OR gates 1220 and 1222 through an AND gate, which receives as inputs the Q output and a delayed inverted version thereof.

A second layer of D flip flops 1226, 1228, and 1230 are configured as toggle flip flops with their Q_bar outputs connected to their D inputs. Accordingly, the second layer flip flops 1226, 1228, and 1230 toggle at rising edges of their respective clock input signal 1202, 1204, and 1206. Note that the rising edges in the signals 1202, 1204, and 1206 correspond to state transitions in the data encoding scheme. As such, since exactly one state transition may occur at any time, only one of the second layer D flip flops 1226, 1228, 1230 toggles at any time. The Q_bar outputs of flip flops 1226, 1228, and 1230 are input into a three input XOR gate 1232 to generate a receiver clock Rx_Clk 1236. Note that the receiver clock 1236 will toggle whenever any one of the Q_bar outputs of the flip flops 1226, 1228, and 1230 toggles, thereby generating a half rate clock.

The third layer D flip flops 1240, 1242, and 1244 have clock inputs respectively driven by the signals A-to-B 1202, B-to-C 1204, and C-to-A 1206. Their D inputs are cross-coupled to the Q outputs of the first layer, such that the Q output of the first layer flip flop 1216 is coupled to the D input of the flip flop 1240, the Q output of the first layer flip flop 1212 is coupled to the D input of the flip flop 1242, and the Q output of the first layer flip flop 1214 is coupled to the D input of the flip flop 1244.

As such, the third layer flip flops 1240, 1242, and 1244 capture the C-to-A, A-to-B, and B-to-C state occurrences, respectively, and output logic 1 for the (C-to-A) to (A-to-B), (A-to-B) to (B-to-C), and (B-to-C) to (C-to-A) transitions, respectively. These transitions are clockwise transitions. For counter-clockwise transitions, the flip flops 1240, 1242, and 1244 all output logic 0. Note that since exactly one state transition may occur at any time, only one of the Q outputs of the flip flops 1240, 1242, and 1244 can be a logic 1 at any time.

The Q outputs of the flip flops 1240, 1242, and 1244 are input into the multiplexer circuit 1246, with the Q outputs from the first flip flop layer 1210 providing the select inputs of the multiplexer. In one embodiment, the multiplexer 1246 includes a layer of AND gates 1248, 1250, and 1252 followed by a three input OR gate 1254. The AND gates 1248, 1250, and 1252 provide the inputs of the OR gate 1254, which provides output signal 1256 of CDR circuit 1200. Note that the output signal 1256 is a logic 1 whenever any one of the AND gates 1248, 1250, and 1252 outputs a logic 1, which only occurs on clockwise state transitions, as described above. Accordingly, the output signal 1256 is a logic 1 for clockwise state transitions and a logic 0 for counter-clockwise state transitions, thereby having the ability to recover information encoded according to the three phase modulation scheme.

Figure 13:
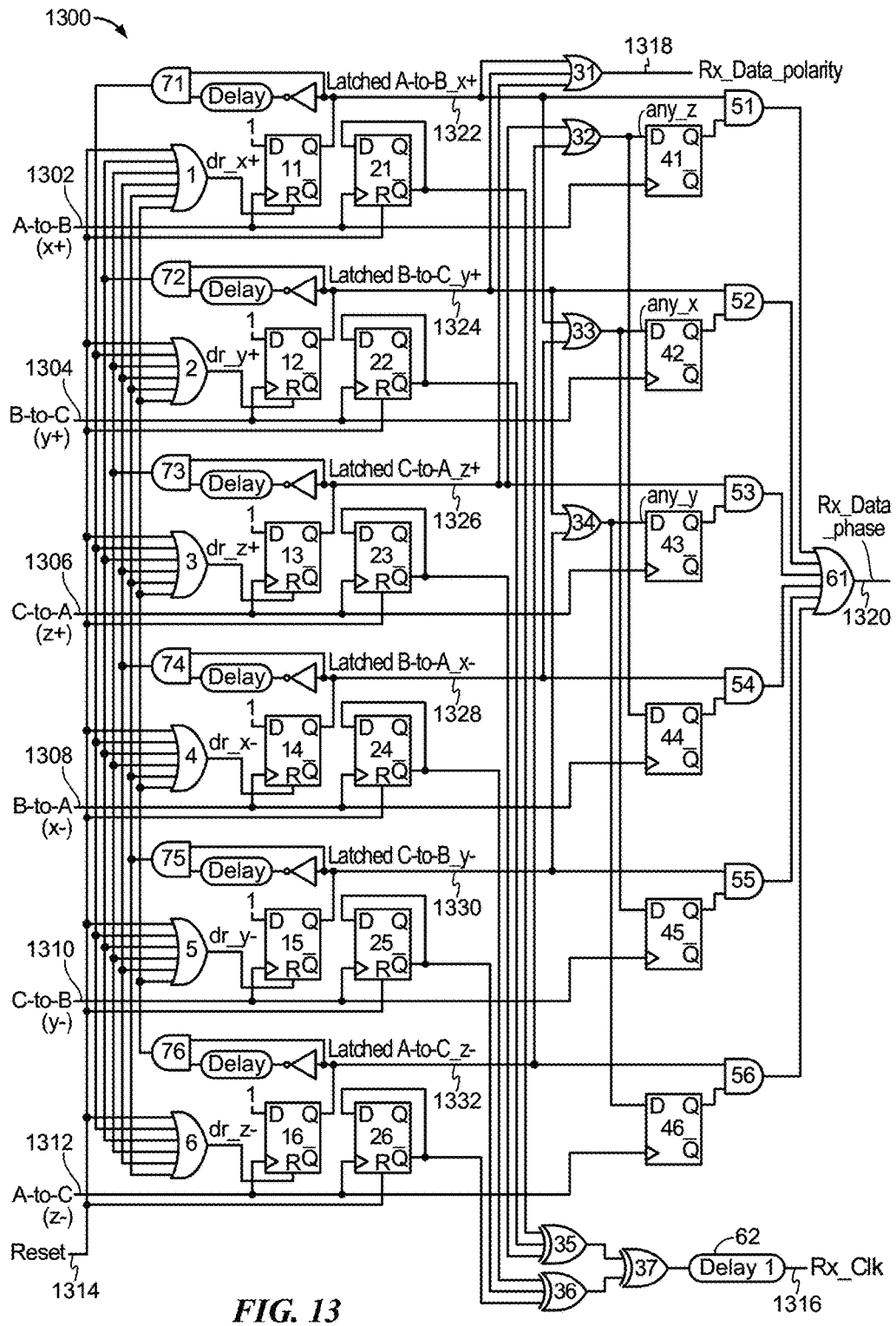
FIG. 13 illustrates an example of a clock and data recovery circuit used to decode data transmitted according to a polarity-encoded three phase modulation data encoding scheme.

FIG. 13 illustrates an example CDR circuit 1300 which can be used to decode data transmitted according to a polarity encoded three phase modulation data encoding scheme. Other CDR circuit implementation can also be used as would be understood by a person skilled in the art based on the teachings herein. The operation of the CDR 1300 is described below.

The CDR 1300 receives input signals 1302, 1304, 1306, 1308, 1310, and 1312 from preceding analog circuits. At any time, only one of the signals 1302, 1304, 1306, 1308, 1310, and 1312 can have a value of one, depending on which of the encoding states just occurred. In implementation, overlaps or gaps between the signals may occur. The inputs signals 1302, 1304, 1306, 1308, 1310, and 1312 are respectively coupled to the clock inputs of the D flip flops 11-16. Each of the D flip flops 11-16 has its D data input coupled to a logic one, which causes its Q output to have a value of one whenever its respective clock input experiences a rising edge transition. For example, the D flip flop 11 will have a Q output of one whenever input signal 1302 experiences a rising edge transition, or equivalently, whenever state A-to-B positive occurs. As such, the D flip flops 11-16 capture which of the six states has just occurred, as indicated by their respective Q outputs 1322, 1324, 1326, 1328, 1330, 1332. Since only one state can occur at any time, only one of the outputs 1322, 1324, 1326, 1328, 1330, 1332 can continue to have a value of one at any time. As will be further described below, there will be a short overlap whenever a new state occurs with the Q outputs corresponding to the current state and the new state both having a value of one for the duration of the delay to reset the flip-flops.

When any of the states is captured by one of D flip flops 11-16, the other flip flops will be reset. In the CDR circuit 1300, this may be achieved using the OR gates 1-6, which generate reset signals for respective D flip flops 11-16. The OR gates 1-6 receive as input pulses caused by rising edges on the Q outputs of the D flip flops 11-16 except for the Q output of its respective D flip-flop and a Reset signal 1314. For example, the OR gate 1 receives pulses caused by rising edges on the Q outputs 1324, 1326, 1328, 1330, and 1330 (but not the Q output 1322 of its respective D flip flop 11) of the D flip-flops 12-16 and the Reset signal 1314. Accordingly, the output of the OR gate 1 will be one whenever any state other than A-to-B positive occurs or if the Reset signal 1314 is asserted. One the other hand, when state A-to-B positive occurs and the Reset signal 1341 is not asserted, the OR gate 1 will output a value of zero.

In one example, to ensure that the D flip-flops 11-16 are only reset momentarily when a non-respective state occurs, the Q outputs of the D flip-flops 11-16 are coupled to the OR gates 1-6 through a circuitry, which ensures that the OR gates 1-6 are only provided with a pulse and not a continuous signal of value one. For example, the Q output 1322 of the D flip-flop 11 is coupled to the OR gates 2-6 through an AND gate 71. The AND gate 71 receives as inputs the Q output 1322 and a delayed inverted version of the Q output 1322. Note that right before the D flip-flop 11 captures an A-to-B positive state occurrence, the output of the AND gate 71 is zero because the Q output 1322 is zero (the D flip-flop 11 would have been reset previously). On the other hand, the delayed inverted version of Q has a value of one. When the A-to-B positive input occurs, the Q output 1322 changes to one. The delayed inverted version of Q maintains a value of one for the duration of the delay (generated by a delay element as illustrated) before changing to zero. Accordingly, for the duration of the delay, the AND gate 71 outputs a value of one, creating a pulse which resets flip-flops 12-16.

The D flip-flops 21-26 are used to generate a double data rate clock signal Rx_clk 1316, which transitions whenever a new input is presented. The D flip-flops 21-26 respectively receive as clock inputs input signals 1302, 1304, 1306, 1308, 1310, and 1312. The D flip-flops 21-26 also receive the Reset signal 1314. As shown in FIG. 13, each of the D flip flops 21-26 has its Q_bar output fed back to its D data input. As such, for each of the D flip-flops 21-26, whenever its respective input clock signal experiences a rising edge transition, its Q_bar output will toggle from one to zero or from zero to one. The Q_bar outputs of the D flip-flops 21-26 are input together through the XOR gates 35 and 36, as illustrated in FIG. 13. The outputs of the XOR gates 35 and 36 are, in turn, input together through the XOR gate 37. The XOR gate 37 outputs a value of one whenever an odd number of the Q_bar outputs of the D flip-flops 21-26 have a value of one. Since only one of the Q_bar outputs of the D flip-flops 21-26 toggles at any one time while the others will maintain the same value, the output of the XOR gate 37 toggles for each change in the inputs 1302, 1304, 1306, 1308, 1310, and 1312. This generates the double data rate clock signal Rx_Clk 1316. In an embodiment, a delay element 62 is used to ensure that the Rx_Clk signal is in synchronism with the other signals that are output by the CDR circuit 1300.

The OR gate 31 generates the Rx_Data_Polarity signal 1318, which indicates whether the state that just occurred is of positive or negative polarity. The OR gate 31 receives as inputs the Q outputs 1322, 1324, and 1326 of the D flip-flops 11-13, respectively. As such, the OR gate 31 outputs a value of one whenever a positive polarity (A-to-B positive, B-to-C positive, or C-to-A positive) input occurs. On the other hand, the Rx_Data_Polarity signal 1318 will have a value of zero when a negative polarity state occurs.

The OR gates 32 33, and 34 are used to capture respectively when a C-to-A state (positive or negative polarity), an A-to-B state (positive or negative polarity), and a B-to-C state (positive or negative polarity) occurs regardless of polarity. For example the OR gate 32 receives as inputs the Q_outputs 1326 and 1332 of the D flip-flops 13 and 16, respectively. As such, the OR gate 32 outputs a value of one whenever C-to-A positive or C-to-A negative occurs.

The outputs of OR gates 32-34 are coupled to the D data inputs of D flip-flops 41-46, as illustrated in FIG. 13. The output of the OR gate 32 is coupled to the D inputs of the D flip-flops 41 and 44. Similarly, the output of the OR gate 33 is coupled to the D inputs of the D flip-flops 42 and 45, and the output of the OR gate 34 is coupled to the D inputs of the D flip-flops 43 and 46. At the same time, the clock inputs of the D flip-flops 41-46 are respectively coupled to inputs 1302, 1304, 1306, 1308, 1310, and 1312. Accordingly, for example, the D flip-flop 41 has a Q output of value one whenever the previous state is C-to-A (regardless of polarity) and the current state is A-to-B positive. This corresponds to the clockwise transitions into the state A-to-B positive from either of states C-to-A positive or C-to-A negative (see also FIG. 5). Similarly, D flip-flop 44 will have a Q output of value one whenever the previous state is C-to-A (regardless of polarity) and the current state is A-to-B negative. This corresponds to the clockwise transitions into the state A-to-B negative from either of states C-to-A positive or C-to-A negative. Accordingly, each of the D flip-flops 41-46 captures one of the six clockwise transitions between the $S_1$, $S_2$ and $S_3$ states depicted in the state diagram 550 of FIG. 5.

The Q outputs of the D flip-flops 41-46 are input together with respective Q outputs of the D flip-flops 11-16 into respective AND gates 51-56, as illustrated in FIG. 13. For example, the Q output of the D flip-flop 41 is input together with the Q output 1322 of the D flip-flop 11 into the AND gate 51. The AND gates 51-56 are used to ensure that only one of the six clockwise transitions is reflected at any time. In other words, only one of the outputs of the AND gates 51-56 can have a value of one at any time. The outputs of the AND gates 51-56 are input together into an OR gate 61 to generate the Rx_Data_Phase 1320. Accordingly, the Rx_Data_Phase 1320 has a value of one whenever a clockwise phase transition occurs and a value of zero otherwise. Note that the Rx_Data_Phase 1320 can have a value of zero if either a counter-clockwise transition or a polarity-only (same phase transition; e.g., A-to-B positive to A-to-B negative) transition occurs. For example, if the current state is A-to-B positive, the CDR circuit 1300 outputs the same values for the Rx_Data_polarity 1318 and the Rx_Data_phase 1320 if the next state is C-to-A negative or A-to-B negative. Therefore, additional circuitry may be required to distinguish between these types of transitions.

Figure 14:
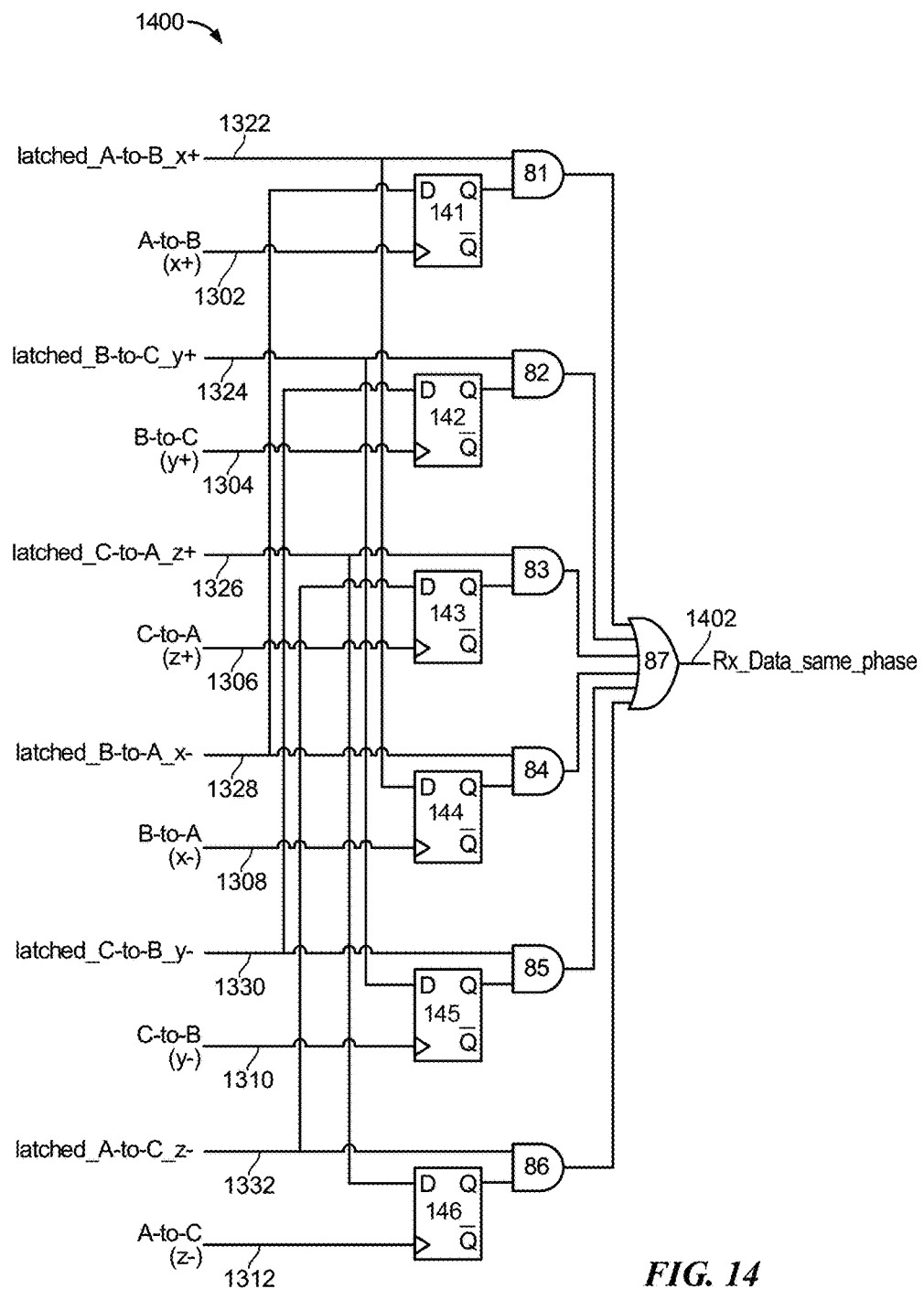
FIG. 14 illustrates an example of circuitry used for capturing polarity-only transitions.

FIG. 14 illustrates additional circuitry 1400 for capturing polarity-only transitions. Inputs to the circuitry 1400 include input signals 1302, 1304, 1306, 1308, 1310, and 1312 and the Q outputs 1322, 1324, 1326, 1328, 1330, and 1332 of the D flip-flops 11-16. The circuitry 1400 includes the D flip-flops 141-146, which are used to capture polarity-only transitions. For example, the D flip-flop 141 receives the input signal 1302 as a clock input and the Q output signal 1328 as D data input and is used to capture A-to-B negative to A-to-B positive transitions. Note that when A-to-B negative occurs, the Q output 1328 will have a value of one. Subsequently, when A-to-B positive occurs, the Q output 1328 will continue to have a value of one for the duration of the delay between the time when the Q output 1322 changes value to one and the time when flip-flops 12-16 are reset. During that delay duration, both input signal 1302 and the Q output 1328 will have a value of one, causing the Q output of D flip-flop 141 to change to a value of one. This also causes the output of the AND gate 81 to have a value of one. The operation of the D flip-flops 142-146 and respective the AND gates 82-86 is similar.

Outputs of AND gates 81-86 are input together into an OR gate 87, which generates the output signal Rx_Data_same_phase 1402. The output signal Rx_Data_same_phase 1402 thus has a value of one whenever any one of the six possible polarity-only state transitions occurs. As such, the Rx_Data_same_phase 1402 can be used to determine whether a transition is polarity-only or counter-clockwise, whenever the Rx_Data_phase 1320 of circuitry 1300 has a value of zero.

Note that the circuitry 1400 is operable together with the CDR circuit 1300 of FIG. 13. In other words, the output Rx_Data_same_phase 1402 of the circuitry 1400 is provided together with the outputs Rx_Clk 1316, Rx_Data_polarity 1318, and Rx_Data_phase 1320 of circuit 1300 to a subsequent decoder stage for decoding, as will be illustrated further below.

Figure 15:
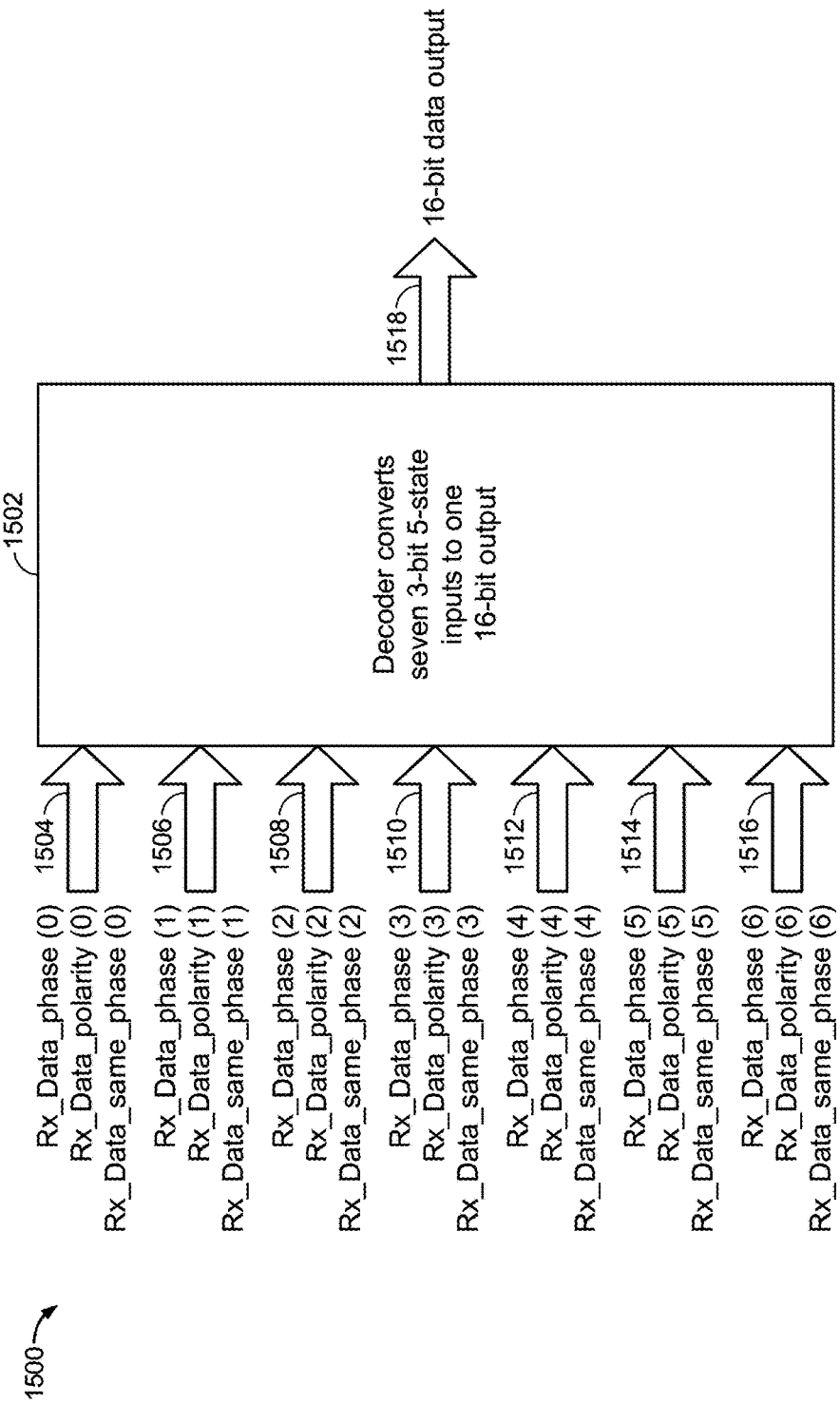
FIG. 15 illustrates an example of an M-wire, N-phase decoder.

FIG. 15 is an example embodiment 1500 of a decoder 1502 that can be used to decode the outputs generated by the CDR circuit illustrated in FIGS. 13 and 14. Decoder 1502 receives seven input sets 1504, 1506, 1508, 1510, 1512, 1514, and 1516. In example embodiment 1500, each input set is a 3-bit input with one bit for each of the Rx_Data_phase, Rx_Data_polarity, and Rx_Data_same_phase outputs of the CDR circuit illustrated in FIGS. 13 and 14. Decoder 1502 decodes the received seven 3-bit input sets to generate a 16-bit data output 1518. Other variations of decoder 1502 are also possible as may be understood by a person skilled in the art. For example, decoder 1502 may receive more or less than seven input sets and/or generate a different length data output 1518.

Figure 16:
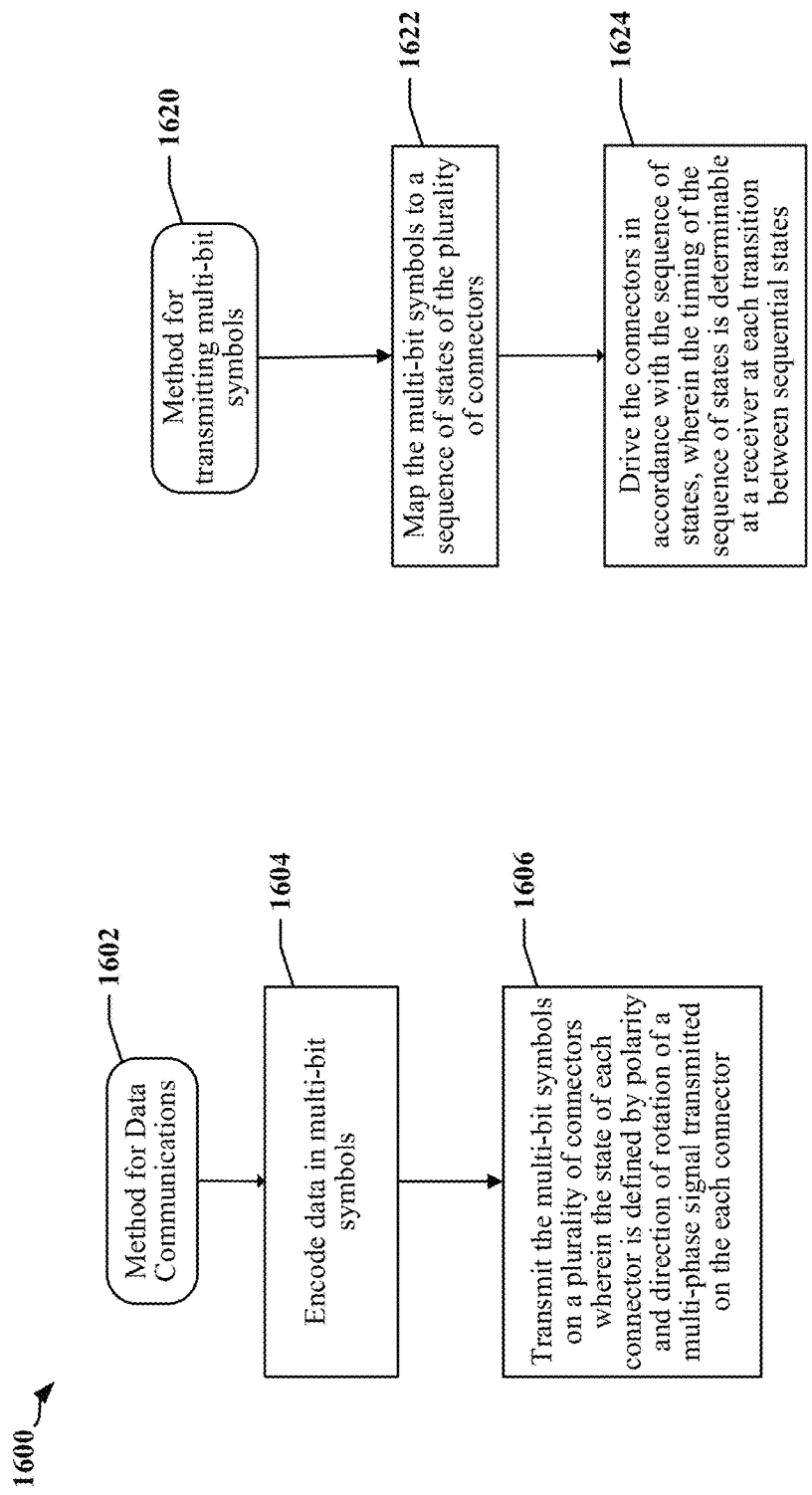
FIG. 16 is a flow chart of a method for data communications.

FIG. 16 is a flow chart 1600 of a method for data communications. The method may employ M-wire N-phase transmission and may use one or more drivers to transmit multi-bit symbols.

At step 1602, data may be encoded into the multi-bit symbols.

At step 1604, the multi-bit symbols may be transmitted on a plurality of connectors. In one example, transmission may be accomplished using drivers configured to implement an N-phase polarity encoding method 1620.

In an aspect of the disclosure, transmitting the multi-bit symbols may include, for example, a step 1622 of mapping the multi-bit symbols to a sequence of states of the plurality of connectors. The state of each connector may be defined by polarity and direction of rotation of a multi-phase signal transmitted on the each connector.

In an aspect of the disclosure, transmitting the multi-bit symbols may include, for example, a step 1624 of driving the connectors in accordance with the sequence of states. The timing of the sequence of states may be determinable at a receiver at each transition between sequential states. For each state in the sequence of states, the multi-phase signal carried on each connector may be phase-shifted with respect to the multi-phase signal carried on the other connectors. The state of at least one of the plurality of connectors may change at each transition between the sequence of states.

In an aspect of the disclosure, the plurality of connectors may include a plurality of wires. The multi-bit symbols may be transmitted on the plurality of connectors by leaving a first wire undriven and providing a voltage differential between a second wire and a third wire during a first of two sequential time intervals, and leaving the second wire undriven and providing the voltage differential between the first wire and the third wire during a second of the two sequential time intervals. During the second of the two sequential time intervals, the multi-bit symbols may be transmitted on the plurality of connectors by reversing the polarity of the voltage differential. At least one of the plurality of wires is undriven during each of the sequential time intervals.

In an aspect of the disclosure, at least one of a change of polarity of the voltage differential and a change of wire that is undriven occurs at each transition between the sequence of states. A wire that has been left undriven may be open-circuited. Leaving a wire undriven may include causing the wire to transition toward a voltage level that lies substantially halfway between voltage levels of a pair of driven wires.

In an aspect of the disclosure, there is no significant current flow through a wire that has been left undriven.

In an aspect of the disclosure, the multi-phase signal transmitted on each connector comprises one of two three-phase signals that have different phase rotation directions.

In an aspect of the disclosure, the multi-phase signal transmitted on each connector is a three-phase signal. The plurality of connectors may include three or more connectors.

In an aspect of the disclosure, the plurality of connectors comprises two groups of three connectors, and wherein different symbols are encoded on each group of three connectors.

In an aspect of the disclosure, the plurality of connectors comprises four or more connectors, and wherein each symbol is encoded for transmission using the four or more connectors.

Figure 17:
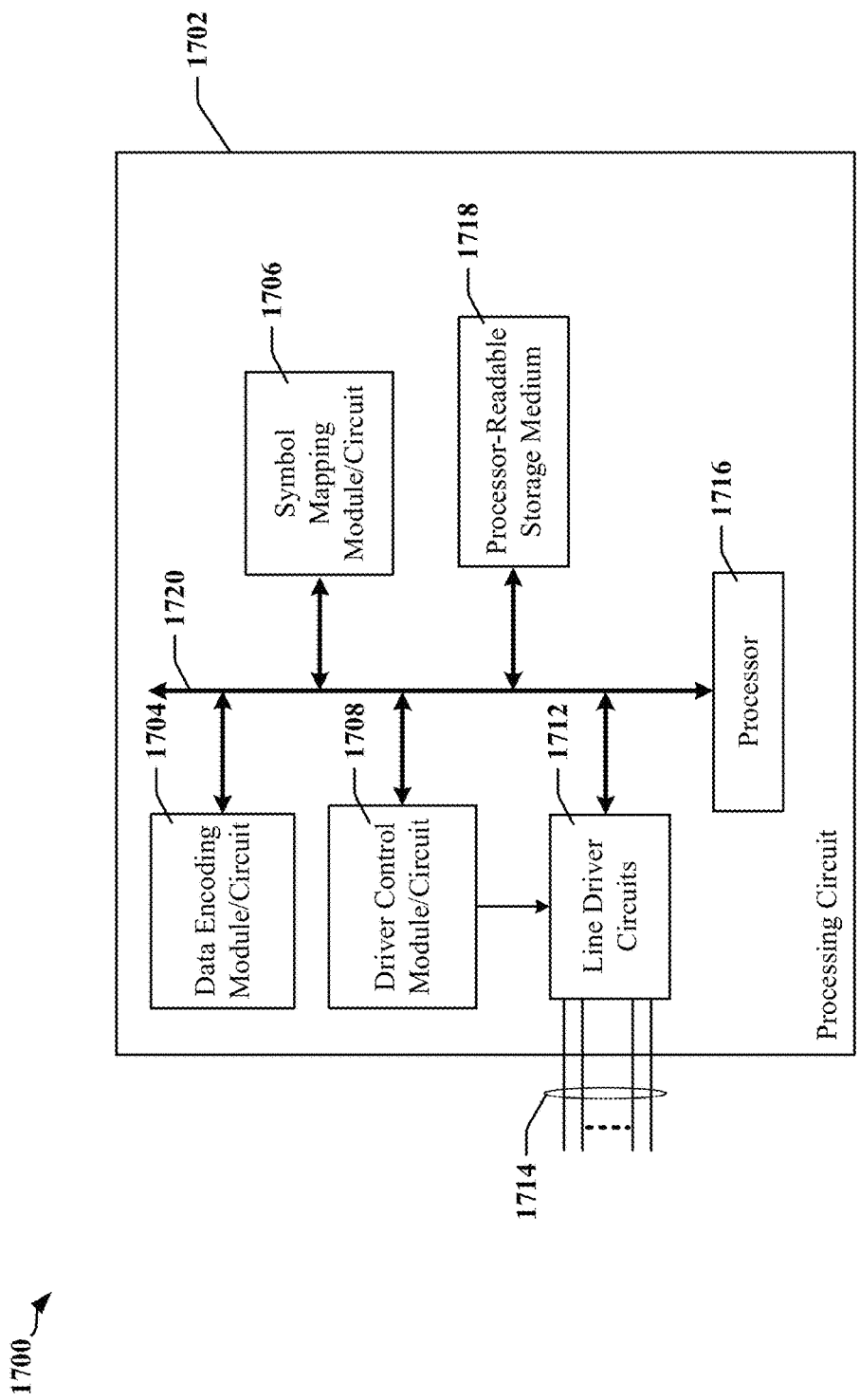
FIG. 17 is a diagram illustrating an example of a hardware implementation for an apparatus employing M-wire N-phase encoding.

FIG. 17 is a diagram illustrating a simplified example of a hardware implementation for an apparatus 1700 employing a processing circuit 1702. In one example, the apparatus may be comprise one or more of the IC devices 202 and 230 illustrated in FIG. 2. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706 and 1708, line drivers 1712 configurable to drive connectors or wires 1714 and the computer-readable storage medium 1718. The bus 1720 may also link various other circuits such as timing sources, peripherals, voltage regulators, and power management circuits, which are well known in the art, and therefore, will not be described any further.

The processor 1716 may include a microprocessor, a controller, a digital signal processor, a sequencer, a state machine, etc. The processor 1716 is responsible for general processing, including the execution of software stored on the computer-readable storage medium 1718. The software, when executed by the processor 1716, causes the processing circuit 1702 to perform the various functions described supra for any particular apparatus. The computer-readable storage medium 1718 may also be used for storing data that is manipulated by the processor 1716 when executing software. The processing circuit 1702 further includes at least one of the modules 1704, 1706 and 1708. The modules 1704, 1706 and/or 1708 may be software modules running in the processor 1716, resident/stored in the computer-readable storage medium 1718, one or more hardware modules coupled to the processor 1716, or some combination thereof.

In one configuration, the apparatus 1700 for wireless communication includes means 1704 for encoding data in multi-bit symbols, means 1706 for mapping the multi-bit symbols to states of a plurality of connectors 1714, and means 1708 for transmitting the multi-bit symbols on the plurality of connectors 1714.

The aforementioned means may be implemented, for example, using some combination of a processor 206 or 236, physical layer drivers 210 or 240 and storage media 208 and 238. The means 1704 for encoding data in multi-bit symbols may include certain elements of the IC devices 202 and/or 203, the means 1706 for mapping the multi-bit symbols to states of a plurality of connectors 1714 may include one or more of the mappers 402 and 704 illustrated in FIGS. 4 and 7 which may operate in accordance with the principles illustrated in FIGS. 5-7, and the means for transmitting 1708 may include the physical layer drivers 210, 240 of FIG. 2 and may operate in accordance with the principles illustrated in FIGS. 5-8.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A method for data communications, comprising:
at a first device:
encoding a data word in a first plurality of multi-bit symbols;
transmitting the plurality of multi-bit symbols from the first device to provide a three-phase signal on each of a plurality of connectors, wherein the three-phase signal provided on each of three connectors is in a different phase than the three-phase signals provided on the other connectors in the three connectors;
at a second device:
receiving the three-phase signal provided on each of the three connectors;
providing multi-bit symbols representative of a sequence of signaling states of the three connectors;

converting each signaling state in the sequence of signaling states to a second plurality of multi-bit symbol at a second device using timing derived from transitions between sequential signaling states; and decoding the data word from the second plurality of multi-bit symbols at the second device using a clock signal derived from transitions between consecutively-transmitted symbols, wherein a transition in signaling state of the plurality of connectors occurs between transmission of each pair of symbols in the first plurality of multi-bit symbols, and wherein signaling state of each connector is represented in each multi-bit symbol as polarity and direction of rotation of the three-phase signal.

2. The method of claim 1, wherein for each state in the sequence of signaling states, the three-phase signal carried on each connector is phase-shifted by 120 degrees with respect to the three-phase signal carried on other connectors of the plurality of connectors.

3. The method of claim 1, wherein:
the plurality of connectors includes a plurality of wires;
during a first of two sequential time intervals, a first wire is undriven, and a voltage differential is provided between a second wire and a third wire; and
during a second of the two sequential time intervals, the second wire is undriven, and the voltage differential is provided between the first wire and the third wire.

4. The method of claim 1, wherein the three-phase signal transmitted on each connector is defined by three different signaling states.

5. The method of claim 1, wherein the plurality of connectors comprises two groups of three connectors, and wherein different symbols are encoded on each group of three connectors.

6. The method of claim 1, wherein the plurality of connectors comprises four or more connectors, and wherein each multi-bit symbol is encoded for transmission using the four or more connectors.

7. A method of claim 1, wherein four transitions are available from each signaling state, and each multi-bit symbol comprises two bits.

8. A method of claim 1, wherein five transitions are available from each signaling state, and each multi-bit symbol comprises three bits.

9. A method of claim 1, wherein each multi-bit symbol comprises a first bit that determines whether a next signaling state has a different polarity than a current signaling state, and a second bit defines phase rotation associated with the next signaling state.

10. A method of claim 9, wherein the multi-bit symbol comprises a third bit that determines whether the next signaling state involves only a polarity switch from the current signaling state.

11. An apparatus that encodes data, comprising:
a first device that includes:
a wire state encoder configured to provide first multi-bit symbols representative of a sequence of signaling states of three connectors;
a plurality of line drivers coupled to the three connectors and configured to transmit a three-phase signal on each of the three connectors in accordance with the first multi-bit symbols, wherein the three-phase signal transmitted on each of three connectors is in a different phase than the three-phase signals provided on the other connectors in the three connectors; and a second device that includes:
a plurality of differential receivers coupled to pairs of the three connectors and configured to receive the three-phase signal from the three connectors;
a wire state decoder configured to provide second multi-bit symbols representative of a sequence of signaling states of the three connectors;
a clock recovery circuit configured to determine timing of the sequence of signaling states based on transitions between sequential signaling states; and
a decoder adapted to decode data from the multi-bit symbols,
wherein signaling state of each of the three connectors is represented in each multi-bit symbol as polarity and direction of rotation of the three-phase signal.

12. The apparatus of claim 11, wherein for each state in the sequence of signaling states, the three-phase signal carried on each connector is phase-shifted by 120 degrees with respect to the three-phase signal carried on other connectors of the three connectors.

13. The apparatus of claim 11, wherein state of at least one of the three connectors changes at each transition between the sequence of signaling states.

14. The apparatus of claim 11, wherein:
the three connectors comprise three wires;
during a first of two sequential time intervals, a first wire is undriven, and a voltage differential is provided between a second wire and a third wire; and
during a second of the two sequential time intervals, the second wire is undriven, and the voltage differential is provided between the first wire and the third wire.

15. The apparatus of claim 14, wherein there is no significant current flow through an undriven wire.

16. The apparatus of claim 11, wherein the three-phase signal transmitted on each connector is defined by three different signaling states.

17. A apparatus of claim 11, wherein four transitions are available from each signaling state, and each multi-bit symbol comprises two bits.

18. A apparatus of claim 11, wherein five transitions are available from each signaling state, and each multi-bit symbol comprises three bits.

19. A apparatus of claim 11, wherein each multi-bit symbol comprises a first bit that determines whether a next signaling state has a different polarity than a current signaling state, and a second bit defines phase rotation associated with the next signaling state.

20. A apparatus of claim 19, wherein each multi-bit symbol comprises a third bit that determines whether the next signaling state involves only a polarity switch from the current signaling state.

21. An apparatus, comprising:
a first device that includes:
means for encoding data in a first multi-bit symbols representative of a sequence of signaling states of three connectors;
means for transmitting a three-phase signal on each of three connectors in accordance with the first multi-bit symbols, wherein the three-phase signal transmitted on each of three connectors is in a different phase than the three-phase signals provided on the other connectors in the three connectors; and
a second device that includes:
means for receiving the three-phase signal from the three connectors;
means for receiving second multi-bit symbols representative of a sequence of signaling states of the three connectors;

means for determining timing of the sequence of signaling states based on transitions between sequential signaling states; and means for decoding data from the multi-bit symbols, wherein signaling state of each of the three connectors is represented in each multi-bit symbol as polarity and direction of rotation of the three-phase signal.

22. The apparatus of claim 21, wherein for each state in the sequence of signaling states, the three-phase signal carried on each connector is phase-shifted by 120 degrees with respect to the three-phase signal carried on other connectors of the three connectors.

23. The apparatus of claim 21, wherein state of at least one of the three connectors changes at each transition between the sequence of signaling states.

24. The apparatus of claim 21, wherein:

the three connectors comprise three wires;

during a first of two sequential time intervals, a first wire is undriven, and a voltage differential is provided between a second wire and a third wire; and during a second of the two sequential time intervals, the second wire is undriven, and the voltage differential is provided between the first wire and the third wire.

25. The apparatus of claim 24, wherein there is no significant current flow through an undriven wire.

26. The apparatus of claim 21, wherein the three-phase signal transmitted on each connector is defined by three different signaling states.

27. A apparatus of claim 21, wherein four transitions are available from each signaling state, and each multi-bit symbol comprises two bits.

28. A apparatus of claim 21, wherein five transitions are available from each signaling state, and each multi-bit symbol comprises three bits.

29. A apparatus of claim 21, wherein each multi-bit symbol comprises a first bit that determines whether a next signaling state has a different polarity than a current signaling state, and a second bit defines phase rotation associated with the next signaling state.

30. A apparatus of claim 29, wherein each multi-bit symbol comprises a third bit that determines whether the next signaling state involves only a polarity switch from the current signaling state.

* * * * *